US006937692B2

(12) United States Patent
Johnson et al.

(10) Patent No.: US 6,937,692 B2
(45) Date of Patent: Aug. 30, 2005

(54) VEHICLE MOUNTED INSPECTION SYSTEMS AND METHODS

(75) Inventors: James H. Johnson, Henderson, NV (US); Paul Bjorkholm, Newport Beach, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/455,864

(22) Filed: Jun. 6, 2003

(65) Prior Publication Data

US 2004/0247075 A1 Dec. 9, 2004

(51) Int. Cl.[7] .............................................. G01N 23/083
(52) U.S. Cl. ......................................... 378/57; 378/55
(58) Field of Search .............................. 378/57, 55, 51, 378/54, 146, 196–198, 58, 26

(56) References Cited

U.S. PATENT DOCUMENTS

| | | | |
|---|---|---|---|
| 4,400,650 A | 8/1983 | Giebeler, Jr. | |
| 4,430,568 A | 2/1984 | Yoshida et al. | |
| 4,599,740 A | 7/1986 | Cable | |
| 5,065,418 A | 11/1991 | Bermbach et al. | |
| 5,111,494 A | 5/1992 | Turner et al. | |
| 5,124,658 A | 6/1992 | Adler | |
| 5,251,240 A | 10/1993 | Grodzins | |
| 5,422,926 A | 6/1995 | Smith et al. | |
| 5,495,106 A | 2/1996 | Mastny | |
| 5,638,420 A | 6/1997 | Armistead | |
| 5,692,028 A | * 11/1997 | Geus et al. .................... 378/57 |
| 5,764,683 A | 6/1998 | Swift et al. | |
| 5,784,430 A | 7/1998 | Sredniawski | |
| 5,838,759 A | 11/1998 | Armistead | |
| 5,917,880 A | 6/1999 | Bjorkholm | |
| 6,009,146 A | 12/1999 | Adler et al. | |
| 6,058,158 A | 5/2000 | Eiler | |
| 6,192,104 B1 | 2/2001 | Adams et al. | |
| 6,255,654 B1 | 7/2001 | Verbinski et al. | |
| 6,282,262 B1 | 8/2001 | Warburton | |
| 6,292,533 B1 | 9/2001 | Swift et al. | |
| 6,356,620 B1 | 3/2002 | Rothschild et al. | |
| 6,366,021 B1 | 4/2002 | Meddaugh et al. | |
| 6,445,766 B1 | 9/2002 | Whitham | |
| 6,453,007 B2 | 9/2002 | Adams et al. | |
| 6,552,346 B2 | * 4/2003 | Verbinski et al. ......... 250/358.1 |
| 6,563,903 B2 | * 5/2003 | Kang et al. .................... 378/57 |
| 6,628,745 B1 | 9/2003 | Annis et al. | |
| 2002/0136353 A1 | 9/2002 | Kang et al. | |

OTHER PUBLICATIONS

Mcdonald Marci, Checkpoint Terror, U.S. News & World Report, Feb. 11, 2002, p. 52, USA.

* cited by examiner

Primary Examiner—David V. Bruce
Assistant Examiner—Hoon Song
(74) Attorney, Agent, or Firm—Brandon N. Sklar; Kaye Scholer LLP

(57) ABSTRACT

Radiation scanning systems to inspect objects are disclosed comprising a first vehicle supporting a radiation source. A second vehicle supports a detector. The source and the detector may be moved to scan an object, such as a cargo conveyance, between the vehicles. The first and second vehicles may having an expandable length and the source and detector may be moved across the expandable length, to scan long objects. The radiation source may be adapted to emit a vertically diverging beam of radiation, such as a fan beam. The radiation may be X-ray radiation, for example. The vehicle may comprise a truck and an expandable trailer releasably coupled to the truck. The trailer may comprise telescoping rails. The first and second vehicles may be driven to an inspection site, where they may be rapidly deployed. Methods of inspecting objects are disclosed, as well.

41 Claims, 18 Drawing Sheets

VEHICLE MOUNTED INSPECTION SYSTEMS AND METHODS

FIELD OF THE INVENTION

Radiation scanning systems and, more particularly, vehicle mounted radiation scanning systems.

BACKGROUND OF THE INVENTION

Radiation is commonly used in the non-invasive inspection of objects such as luggage, bags, briefcases, and the like to identify hidden contraband and smuggled goods. Contraband includes guns, knives, explosive devices, as well as illegal drugs, for example. Smuggled goods may be identified by comparing the detected contents of objects with a manifest listing of the contents of the objects. As criminals and terrorists have become more creative in the way they conceal contraband, the need for more effective non-invasive inspection techniques has grown. While the smuggling of contraband onto planes in carry-on bags and in luggage has been a well-known, on-going concern, a less publicized but also serious threat is the smuggling of contraband across borders and by boat in large cargo containers. Only 2%–10% of the 17 million cargo containers brought to the United States by boat are inspected. "Checkpoint Terror", U.S. News and World Report, Feb. 11, 2002, p. 52.

One common inspection system is a line scanner, where an object to be inspected, such as luggage, is passed between a stationary source of radiation, such as X-ray radiation, and a stationary detector. The radiation is collimated into a vertical fan beam or a pencil beam and the object is moved horizontally through the beam. The radiation transmitted through the object is attenuated to varying degrees by the contents of the object. The attenuation of the radiation is a function of the density of the materials through which the radiation beam passes. The attenuated radiation is detected and radiographic images of the contents of the objects are generated for inspection. The radiographic image reveals the shape, size, and varying densities of the contents.

Standard cargo containers are typically 20–50 feet long (6.1–15.2 meters), 8 feet high (2.4 meters) and 6–9 feet wide (1.8–2.7 meters). Air cargo containers, which are used to contain a plurality of pieces of luggage or other cargo to be stored in the body of an airplane, may range in size (length, height, width) from about 35×21×21 inches (0.89×0.53× 0.53 meters) up to about 240×118×96 inches (6.1×3.0×2.4 meters). Sea cargo containers are typically about 40–50 feet long, 8 feet wide and 8 feet high. (12.2–15.2×2.4×2.4 meters). Large collections of objects, such as many pieces of luggage, may also be supported on a pallet. Pallets, which may have supporting side walls, may be of comparable sizes as cargo containers. The term "cargo conveyance" is used herein to encompass cargo containers (including sea cargo containers) and pallets.

Fixed inspection systems have been proposed for inspecting large containers. For example, U.S. Pat. No. 4,430,568 to Yoshida discloses an X-ray system for the inspection of packages, including large shipping containers. A conveyor moves the package or container horizontally between the X-ray source supported on a floor and a detector array. Similarly, U.S. Pat. No. 4,599,740 to Cable discloses a fixed inspection system, where an X-ray source transmits a continuous beam of radiation across a conveyor along which the containers to be inspected are moved. The container may be moved either continuously or incrementally. The radiation transmitted through a container is detected by a "folded" sensor screen or device having two, perpendicular arms, one extending vertically along a side of the container and the other extending horizontally over the top of a container during inspection. The folded sensor enables the system to have a smaller height than would otherwise be necessary in order to detect radiation transmitted through the entire container.

It has also been proposed to scan large containers with portable X-ray imaging systems. For example, U.S. Pat. No. 5,638,420 to Armistead discloses a straddle inspection system, wherein a source and a detector of a radiation scanning system are fixed to a movable frame and the frame is moved horizontally along the length of the container while image data is sequentially recorded. U.S. Pat. No. 5,692,028 to Geus et al. discloses an X-ray source mounted on a mobile vehicle and a detector supported by a portal shaped assembly extending from the vehicle. During inspection of an object, which can be another vehicle, the mobile vehicle is driven past the object, such that the object passes through the portal shaped assembly.

U.S. Pat. No. 6,292,533 B1 to Swift, et al. discloses a mobile X-ray inspection system for large objects, such as a cargo container carried by a vehicle, that uses an X-ray source of 450 kV. The source is supported on a truck and a pencil beam is generated to vertically scan the vehicle. Detectors, also supported on the truck or a boom extending from the truck, are provided to detect radiation transmitted through and scattered by the contents of the object. In use, a vehicle to be inspected parks alongside the scanning unit on the truck. The source and detectors are moved horizontally by a translation system within the truck to horizontally scan the vehicle. Scanning is said to be "exceedingly slow" (⅓–⅙ of a mile per hour).

U.S. Pat. No. 5,917,880 to Bjorkholm discloses an X-ray inspection apparatus that may be used to inspect cargo containers, that uses X-ray radiation of about 8 MeV, collimated into a vertical fan beam to scan a truck carrying the cargo. A first detector array is aligned with the fan beam to detect radiation transmitted through the truck. A second detector array is provided to detect radiation forward scattered through the truck. The truck is moved through the vertical fan beam. Data from both detectors is used to determine the average atomic number of the attenuating material in the truck to identify the material content in the truck. Images indicative of the material content are then prepared. Data provided by the first detector array is also used to form radiographs of the truck.

Such systems tend to be expensive, heavy, complex and difficult to transport and set up. Inspection may be slow. Some systems require several days to assemble and disassemble. Other systems are so long and/or heavy, that they require a special road permit to be driven on highways.

Improved radiation inspection systems for vehicles, for cargo conveyances carried by vehicles and for other objects are needed.

SUMMARY OF THE INVENTION

In accordance with an embodiment of the invention, a radiation scanning system to inspect objects is disclosed comprising a first vehicle having an expandable length. A radiation source to illuminate an object to be inspected is movably supported by the first vehicle. The system further comprises a second vehicle having an expandable length. A detector to detect radiation interacting with the object is movably supported by the second vehicle. The first vehicle may comprise a first expandable portion and the source may be movable across the first expandable portion. The second vehicle may comprise a second expandable portion and the detector may be movable across the second expandable portion. The expandable portions may comprise pairs of rails, for example. The source and the detector may be movably supported on the expandable portions. The first and second expandable portions may have a first position supported above ground and a second, lowered position, on the ground. The first and second expandable portions may each comprise telescoping sections. The source and detector may be movable by motors, for example.

The radiation source may be adapted to emit a vertically diverging beam of radiation onto the object and the detector may be adapted to detect the vertically diverging beam after interaction with the object. The vertically diverging beam may be a vertical fan beam, for example. The radiation source may be a source of X-ray radiation, for example.

In accordance with another embodiment, a radiation scanning system to inspect objects is disclosed comprising a first vehicle and a radiation source to illuminate an object to be inspected, movable on the first vehicle. The system further comprises a second vehicle and a detector movable on the second vehicle, to detect radiation after interaction with the object.

In accordance with another embodiment, a radiation scanning system to inspect objects is disclosed comprising at least one vehicle having at least one expandable portion. A radiation source to illuminate an object to be inspected is movable on the at least one expandable portion. A detector to detect radiation interacting with the object is also movable on the expandable portion.

In accordance with another embodiment, a radiation scanning system to inspect objects is disclosed comprising a first and second vehicle. The first vehicle comprises a first drive portion, a first telescoping portion and a radiation source movably supported by the first telescoping portion to illuminate an object to be inspected. The second vehicle comprises a second drive portion, a second telescoping portion and a detector movably supported by the second telescoping portion, to detect radiation interacting with the object.

In accordance with another embodiment, a radiation scanning system to inspect objects is disclosed comprising a first vehicle comprising a first truck, a first telescoping trailer releasably coupled to the first truck and a radiation source movable across at least a portion of the first telescoping trailer to illuminate an object to be inspected. The system further comprises a second truck, a second telescoping trailer releasably coupled to the second truck and a detector movable across at least a portion of the second telescoping trailer, to detect radiation interacting with the object.

In accordance with another embodiment of the invention, a method of inspecting an object is disclosed comprising positioning an object to be inspected between stationary first and second vehicles, wherein the first vehicle movably supports a radiation source and the second vehicle movably supports a detector. The method further comprises moving the radiation source across a length of the first vehicle and illuminating the object with radiation while moving the source. A detector supported by the second stationary vehicle is moved across a length of the second vehicle and radiation interacting with the object by the moving detector is detected.

BRIEF DESCRIPTION OF THE FIGURES

FIG. 3 is a cross-sectional view of one of the rails of the telescoping section of the trailer of FIG. 2a, through line 3—3 of FIG. 2a;

DESCRIPTION OF THE PREFERRED EMBODIMENTS

Figure 1:
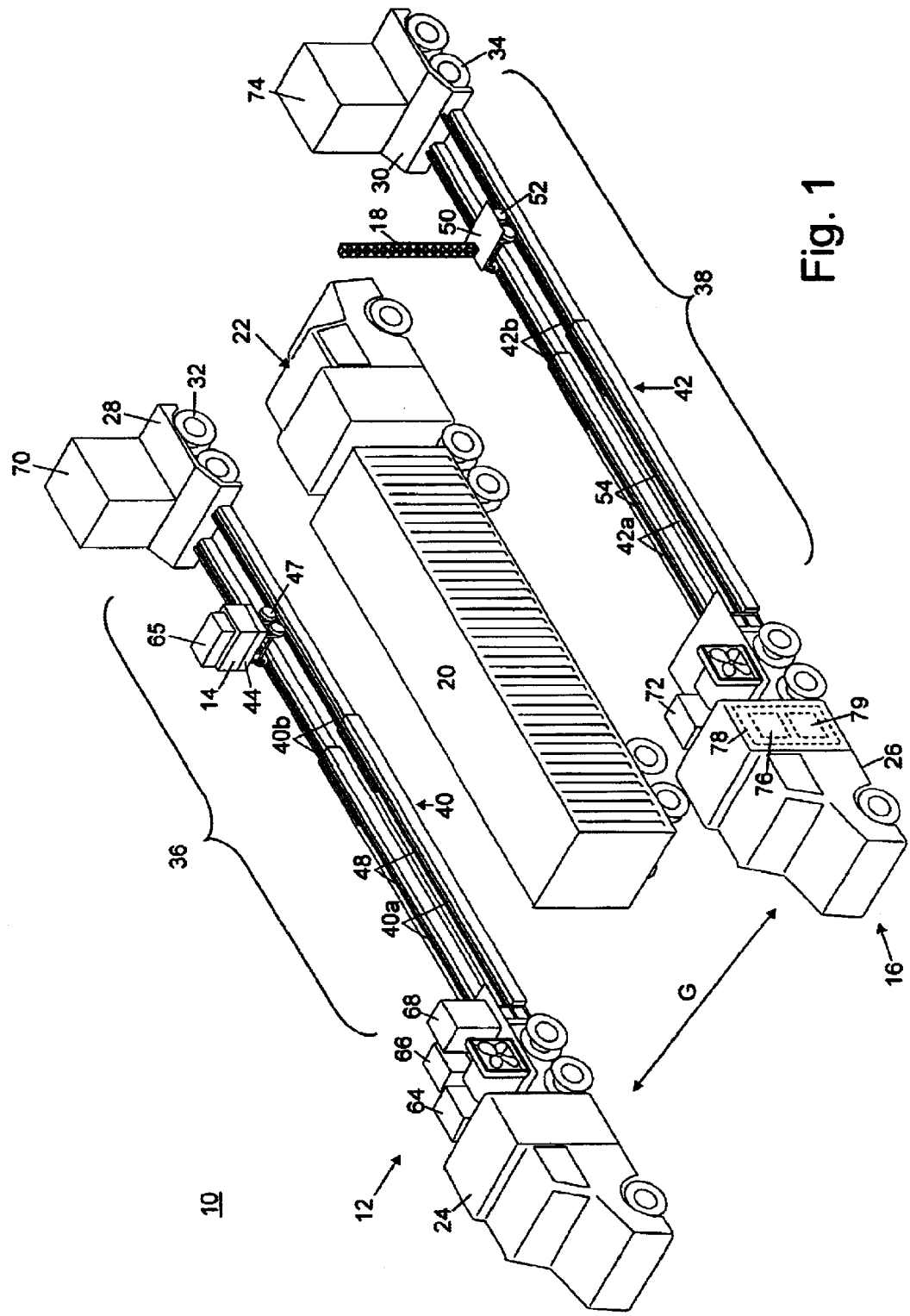
FIG. 1 is a perspective view of a radiation scanning system in accordance with one embodiment of the invention.

FIG. 1 is a perspective view of a radiation scanning system 10 in accordance with one embodiment of the invention. The system 10 comprises a first vehicle 12 supporting a source 14 and a second vehicle 16 supporting a detector 18. A cargo conveyance 20 to be inspected is shown in a gap G between the first and second vehicles 12, 16, in this example carried by a third vehicle 22. Preferably, the source 14 and the detector 18 are movable across the first and second vehicles 12, 16, respectively, to scan the cargo conveyance 20.

Each vehicle 12, 16 comprises respective forward, truck portions 24, 26, rear, carriage portions 28, 30 supporting rear wheels 32, 34, and central portions 36, 38 coupling the forward and rear portions. The source 14 and the detector 18 are movable across the central portions 36, 38, respectively. In this example, the source 14 is adapted to emit a vertically diverging beam, such as a vertical fan beam. The detector 18 in this example extends vertically to detect the vertically diverging radiation beam after interaction with the cargo conveyance 20.

Also in this example, the central portions 36, 38 comprise respective pairs of rails 40, 42. The rail pair 40 of the first trailer 12 supports the radiation source 14 and the rail pair 42 of the second trailer 16 supports the detector 18. Alternatively, either or both of the central portions 36, 38 may be a single rail. The central portions 36, 38 may also comprise other supporting structures besides rails. Either or both of the central portions 36, 38 may be platforms, for example.

Figure 2A:
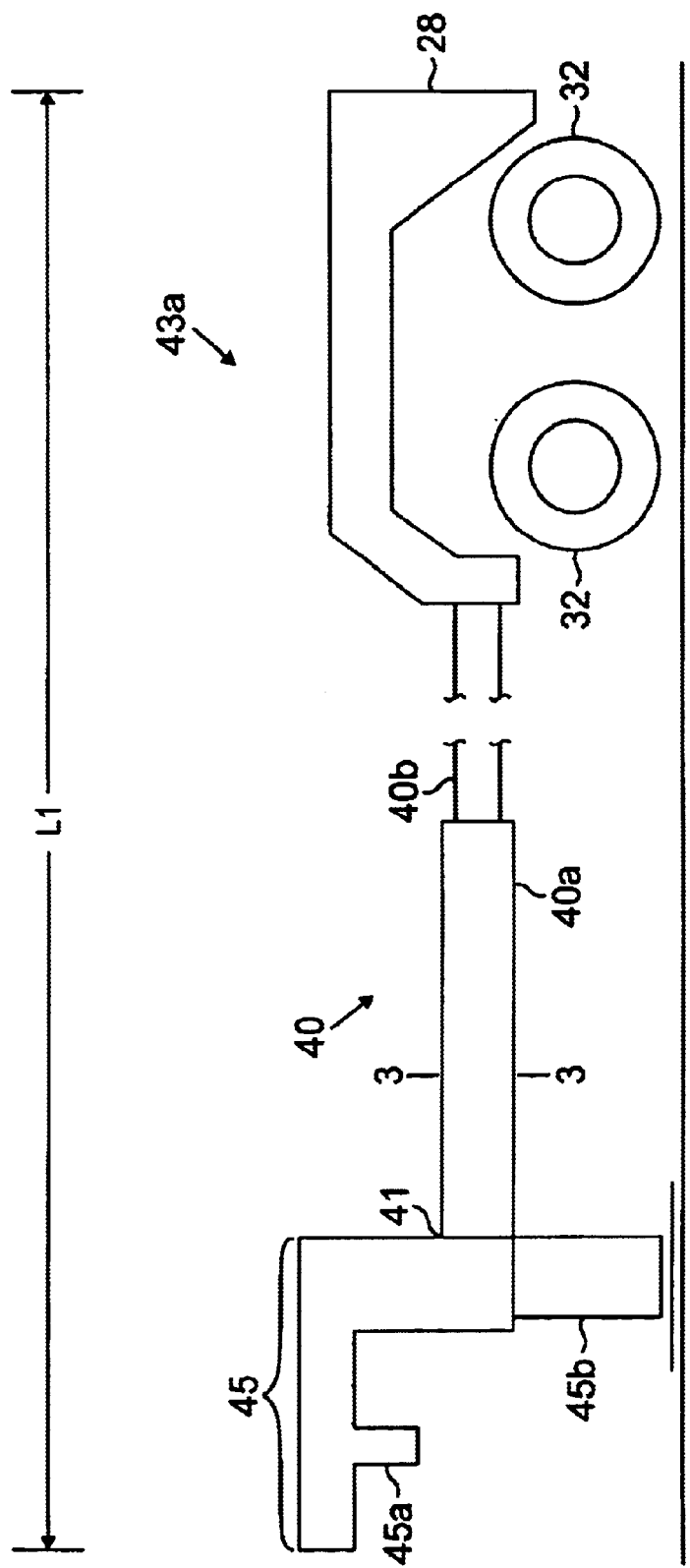
FIG. 2a is a side view of a trailer, which may be part of the first vehicle of the system of FIG. 1, separated from the forward, truck portion of the vehicle.

The forward truck portions 24, 26 may be conventional semi-tractor trucks for hauling trailers, for example, such as a Model 379 or other models available from Peterbilt Motors Company, A Division of PACCAR, Inc., Denton, Tex. The central portions 36, 38 and the rear, carriage portions 28, 30 may be part of a trailer. FIG. 2a is a side view of a trailer 43a, which may be part of the first vehicle 12 separated from the forward, truck portion 24. A similar trailer 43b for the second vehicle 16 is discussed in more detail with respect to FIG. 5. One of the rails 40 and the rear carriage portion 28 are shown, as well. The source 14 and other structures shown on the first vehicle 12 in FIG. 1 are not shown in FIG. 2a, for ease of illustration. The forward ends 41 of the rails 40 are coupled to a pivot support structure 45, that includes a pivot 45a (known as a kingpin) that may be releasably coupled to the forward, truck portion 24, in a manner known in the art. Supporting legs 45b, one of which is shown in FIG. 2a, may extend from the pivot structure 45, to support the trailer 43a when the trailer is not coupled to the forward truck portion 24. The legs 45b may be retracted within the pivot support structure 45 to adjust the height of the legs, as is also known in the art. The supporting legs may extend from the rails, instead. An example of an appropriate trailer 43a is identified below.

Figure 3:
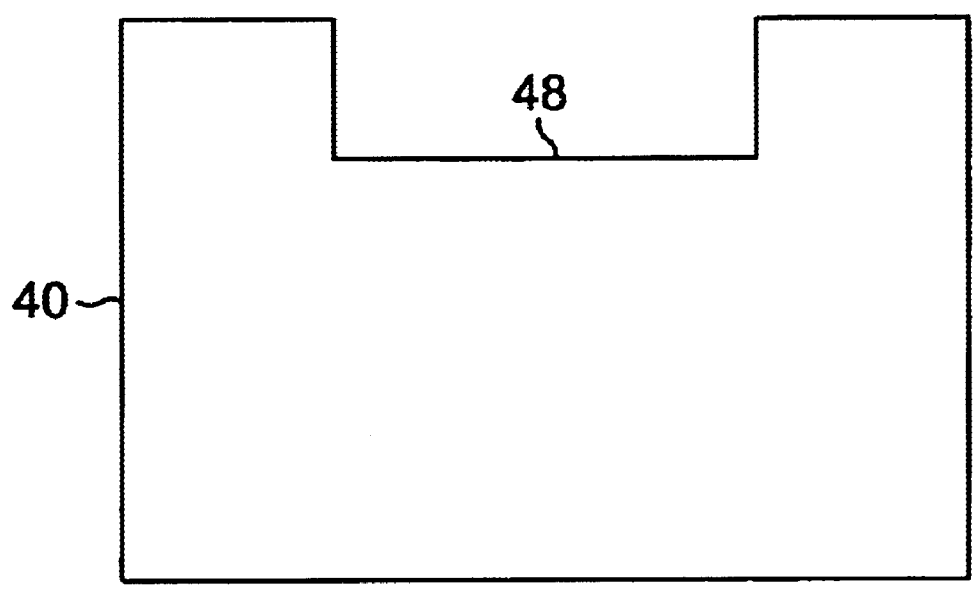

Returning to FIG. 1, the source 16 may be supported on a carriage 44 with wheels 47 to facilitate movement along the rails 40. The wheels 47 may be received within one or more channels 48 in the rails 40. Similarly, the detector 18 may be supported on a carriage 50 with wheels 52 movable within channels 54 in the rails 42 of the second vehicle 16. FIG. 3 is a cross-sectional view of one of the rails 40 through line 3 3 of FIG. 2a, better showing the channel 48. The channels 52 in the rails 42 are similar.

The carriages 44, 50 may be driven by electric, direct drive motors (not shown) coupled to the wheels 47, 52. The motors may be variable speed AC vector drive electric motors, for example. Appropriate motors are readily commercially available. The drive speed may be about 100 feet (about 30.48 meters) per minute.

A tachometer coupled to the source 14 or motor moving the source may be used to synchronize movement of the detector 18 (or vice versa) so that they stay aligned during scanning. A proportional integral derivative (PID) loop derived from an absolute positional reference system may be used to correct for errors in the motion of the detector 18, for example.

Alternatively, the carriages 44, 50 may be driven by motor driven endless belts moving within the channels 48, 52. In another alternative, the carriages may be supported and moved by an air cushion generated by compressed air.

Figure 2B:
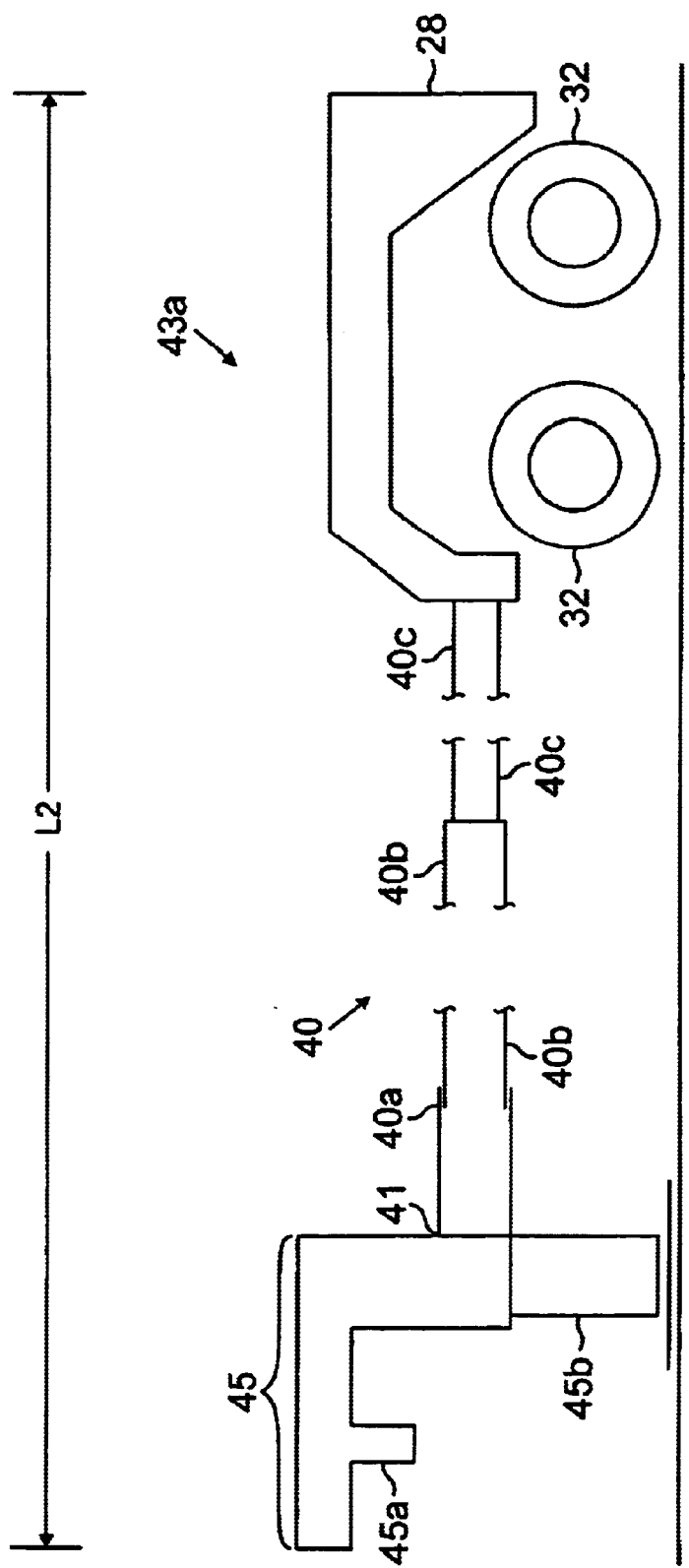
FIG. 2b is a side view of a trailer that is similar to the trailer of FIG. 2b, having an additional telescoping section.

Preferably, the rails 40, 42 are telescoping rails, comprising first sections 40a, 42a, received within second sections 40b, 42b, respectively, as shown in FIGS. 1 and 2a. More preferably, third rail sections 40c are received within the first sections 40a, 42a, respectively, as shown in FIG. 2b, to provide for additional length. In FIGS. 1, 2a and 2b, the rails 40, 42 are in a first, deployed position, wherein the first rails 40a, 42a extend from the second rails 40b, 42b, to extend the lengths of the central portions 36, 38 of the first and second vehicles 12, 16, at least beyond the length of the cargo conveyance 20 to be scanned. Preferably, the lengths of the central portions 36, 38 extend beyond the length of the third vehicle 22 supporting the cargo conveyance 20, as well, as shown in FIG. 1, so that the entire vehicle 22 may be scanned.

Figure 4:
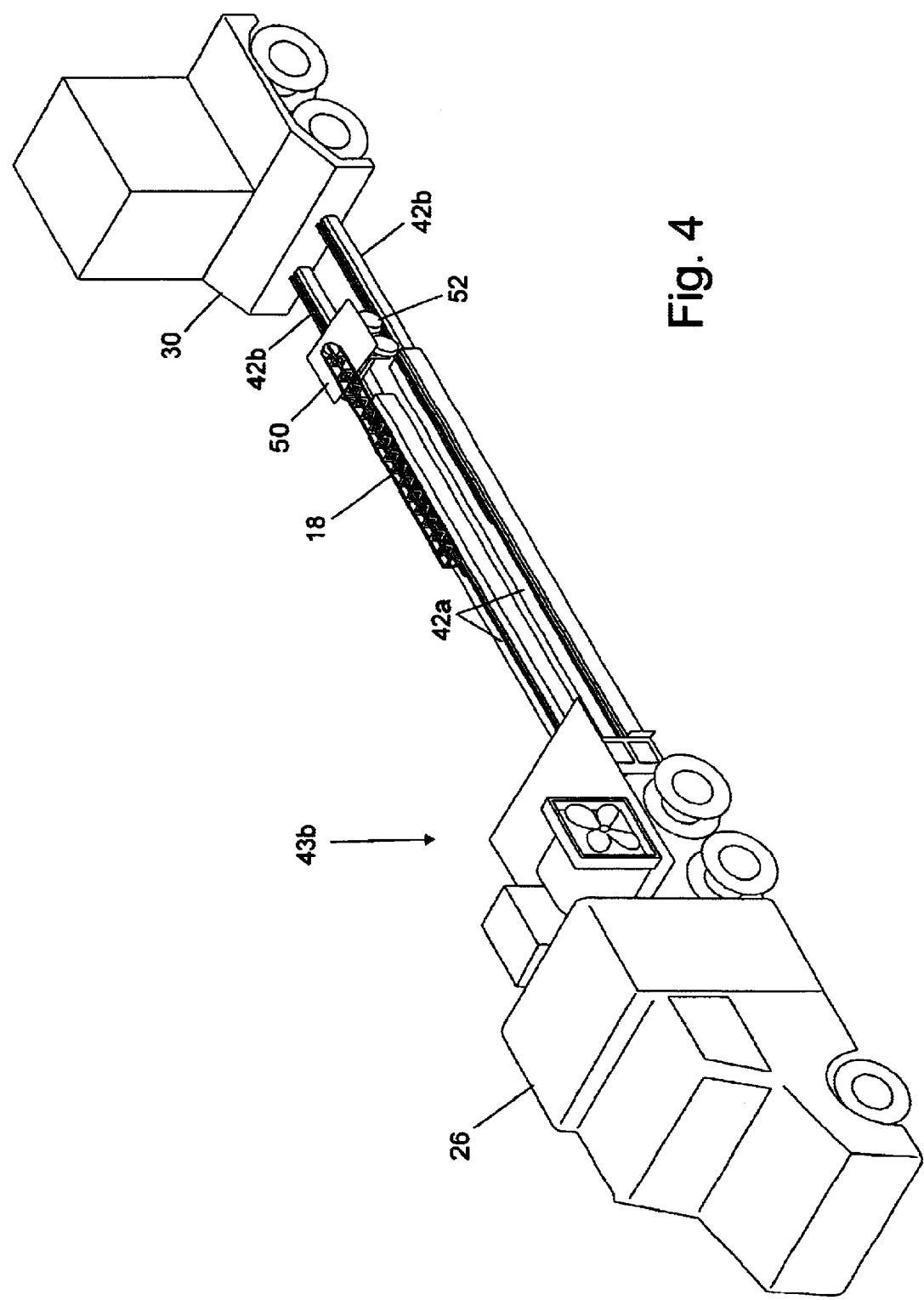
FIG. 4 is a perspective view of the second vehicle, including the forward, truck portion coupled to a trailer, in a non-deployed position.

FIG. 4 is a perspective view of the second vehicle 16, including the forward, truck portion 26 coupled to a trailer 43b. The rails 42 are in a second, non-deployed position, wherein the first rail sections 40a are received within the second rail sections 40b along much of their lengths, reducing the length of the vehicles. The vehicle 14 may thereby be more readily driven to and from an inspection site. The rails 40 of first vehicle 16 preferably have a similar second, non-deployed position to facilitate driving, as well. The reduced length of the vehicles 12, 16 also avoids the need for special permits to drive the vehicles on the roads.

Figure 5:
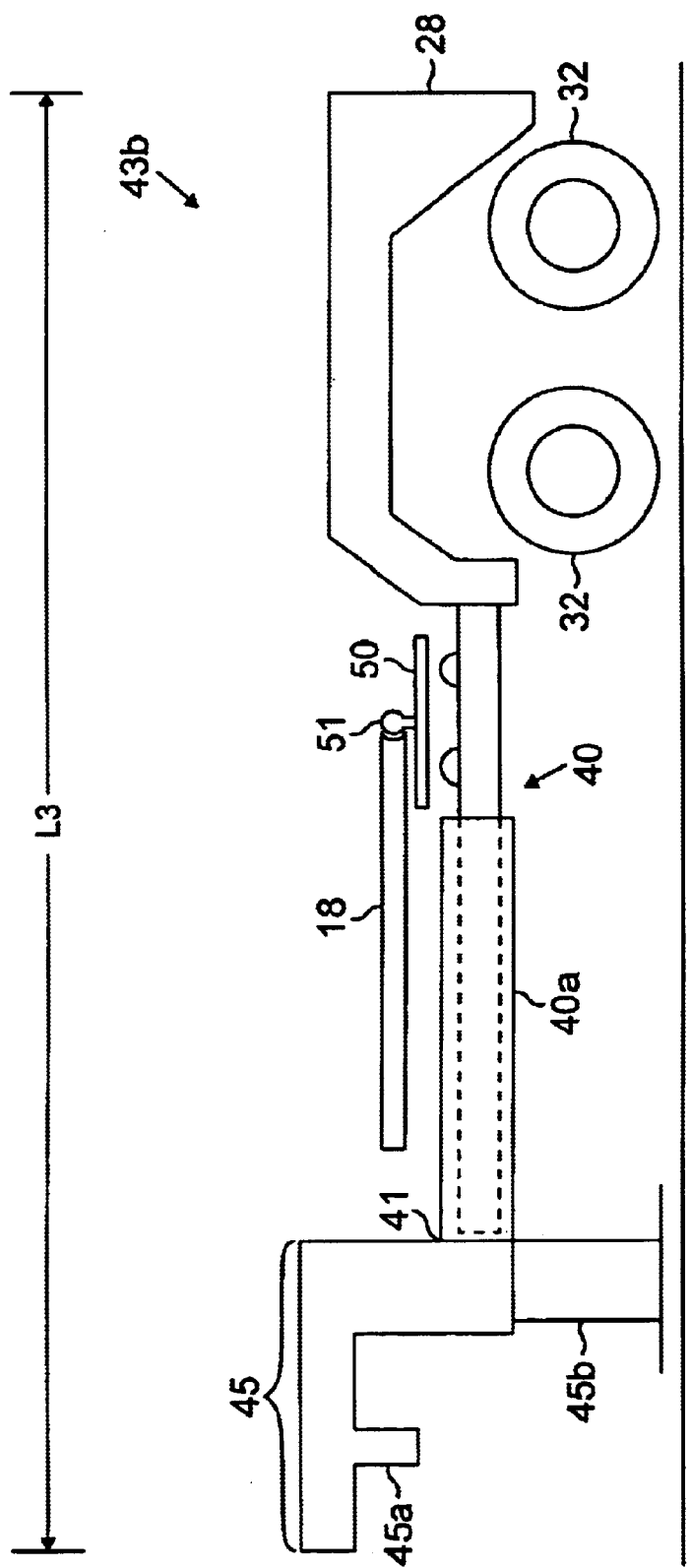
FIG. 5 is a side view of the trailer of the second vehicle, with the rails in a non-deployed position.

FIG. 5 is a side view of the trailer 43b with the rails 40 in their second, non-deployed position. In FIG. 5 (and FIG. 4) the detector 18 is shown in a preferred, non-deployed position in which the detector is horizontal, to protect the detector 18 during driving. In FIG. 1, the detector 18 extends vertically in a deployed position, to detect a vertically diverging fan beam of radiation transmitted through the cargo conveyance 20a. The detector 18 may be mounted to the carriage 50 via a pivot 51, shown best in FIG. 5. A motor (not shown) coupled to the pivot 51 and detector 18 may rotate the detector from the non-deployed position to the deployed position before, during or after the rails are extended from the second, non-deployed position to the first, deployed position.

The trailers 43a, 43b may have lengths L1 of about 70 feet (about 21.3 meters), for example, when in the first, deployed position, as shown in FIG. 2a. The extended rails themselves may have a length of about 52 feet (about 15.8 meters), providing a scanning length of about that length. With an additional set of rails 43c received with the rails 43b, as shown in FIG. 2b, the trailers 43a, 43b may have lengths L2 of about 107 feet (about 32.6 meters), for example. The extended rails 40, 42 in FIG. 2b may have a length of about 87 feet (about 26.5 meters), providing a scanning length of about that length. When in the second, non-deployed position of FIG. 5, the trailers 43a, 43b may have lengths L3 of about 53 feet (about 16.2 meters), for example. A 53-foot trailer 43a, 43b may be driven by a truck 24, 26 without a permit. The rails 40, 42 may be extended from the non-deployed to the deployed position by releasing a lock securing the rails together, and driving the truck portions 24, 26 of the vehicles 14, 16 forward a desired distance. Telescoping trailers 43 are known in the art. Suitable telescoping trailers are available from Talbert Manufacturing, Inc., Rensselaer, Ind. ("Talbert"), under the tradename Double Drop Trailer, for example. The Talbert Double Drop Trailers have one pair of rails received within another pair of rails, as in FIG. 2a. An additional pair of telescoping rails, as in FIG. 2b, may be readily provided in the Talbert Double Drop Trailers. The Talbert Double Drop Trailers have an auto-leveling option, to compensate for irregular terrain.

Figure 6:
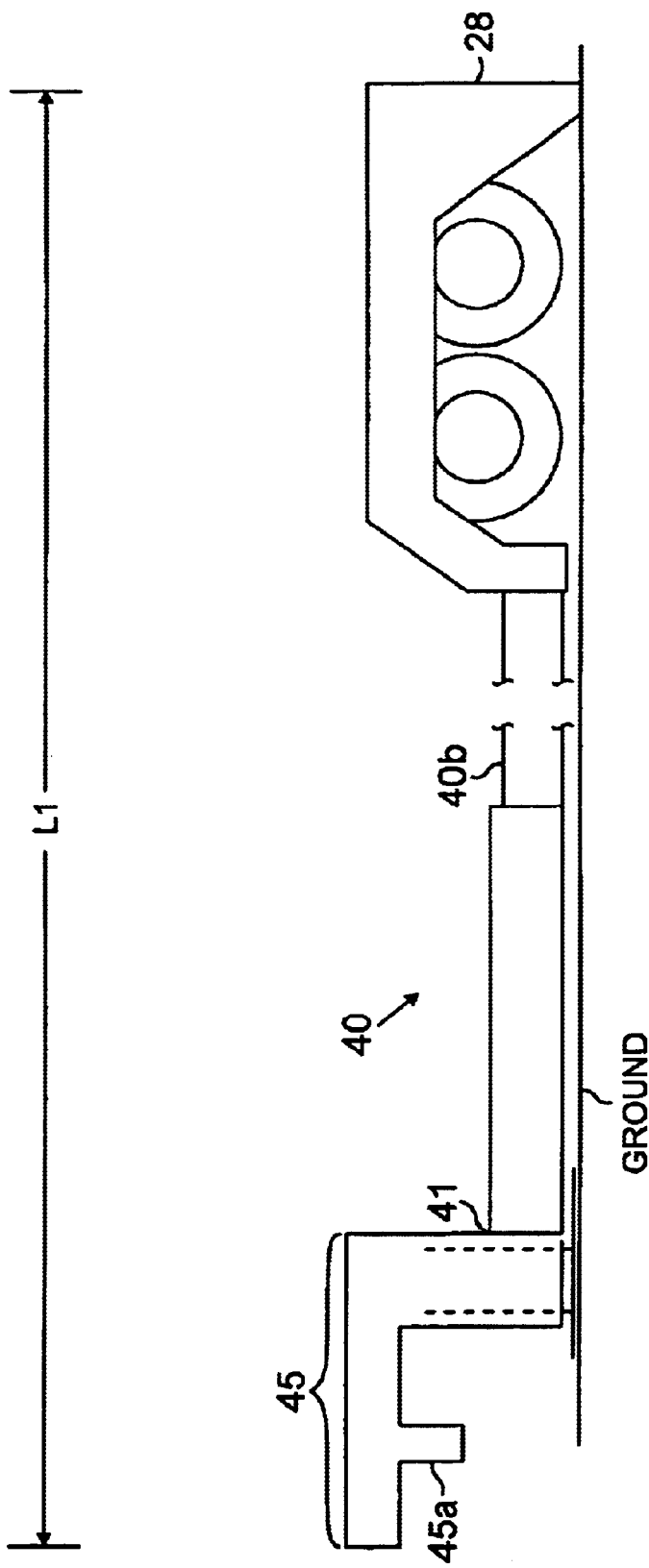
FIG. 6 is a side view of the trailer in a deployed position, with the rails lowered to the ground.

As mentioned above, the supporting legs 45b, shown in FIGS. 2 and 5, are preferably retractable. The rear wheels 32, 34 of the rear, carriage portions 28, 30 of the first and second vehicles 12, 14 are also preferably retractable. During use, the forward, truck portions 24, 26 of the vehicles 12, 14 are preferably separated from the trailers 43, 43b, respectively, after the rails 40, 42 of the trailers 43a, 43b are extended to their deployed positions. The wheels 32, 34 and the legs 45b are retracted, lowering the rails 40, 42 to the ground, for support during operation, as shown in FIG. 6. The Talbot Double Drop Trailers may be obtained with retractable legs and wheels, as well.

Figure 7:
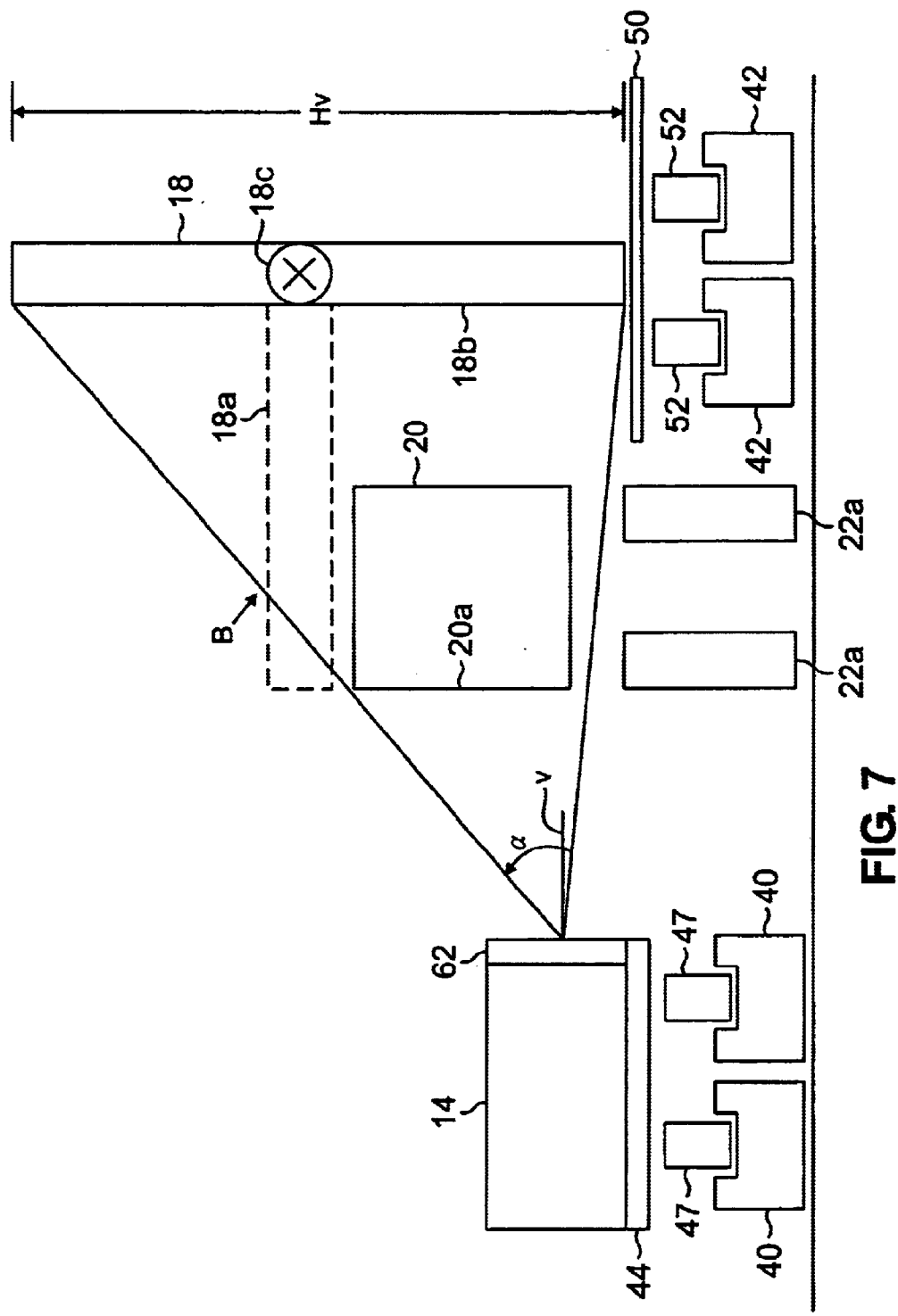
FIG. 7 is a front view of the source and the detector of the radiation scanning system of an embodiment of the invention, during scanning of an object, such as a cargo conveyance on a third vehicle.

FIG. 7 is a front view of the source 14 and the detector 18 of the radiation scanning system 10 during use scanning the cargo conveyance 20 on the third vehicle 22 (the wheels 22a of the third vehicle are shown). The source 14 and the detector 18 are shown supported by the carriages 44, 50 and the rails 40, 42, respectively. Preferably, the radiation beam is a vertically diverging beam B, as shown in FIG. 7. More preferably, the radiation beam is a vertically diverging fan beam. A cone beam may be used, as well. The detector 18 extends vertically a sufficient distance to collect the radiation beam B after interacting with the cargo conveyance 20. Here, the term "fan beam" refers to a diverging radiation beam having essentially only one dimension, such as a vertical dimension. The term "cone beam" refers to a two dimensional diverging radiation beam, such as a radiation beam that diverges horizontally and vertically. The cone beam need not be a mathematical cone; it may be an arbitrarily shaped cone with a cross-section having an outer edge with a rectangular, square, circular or elliptical shape, for example.

Figure 8:
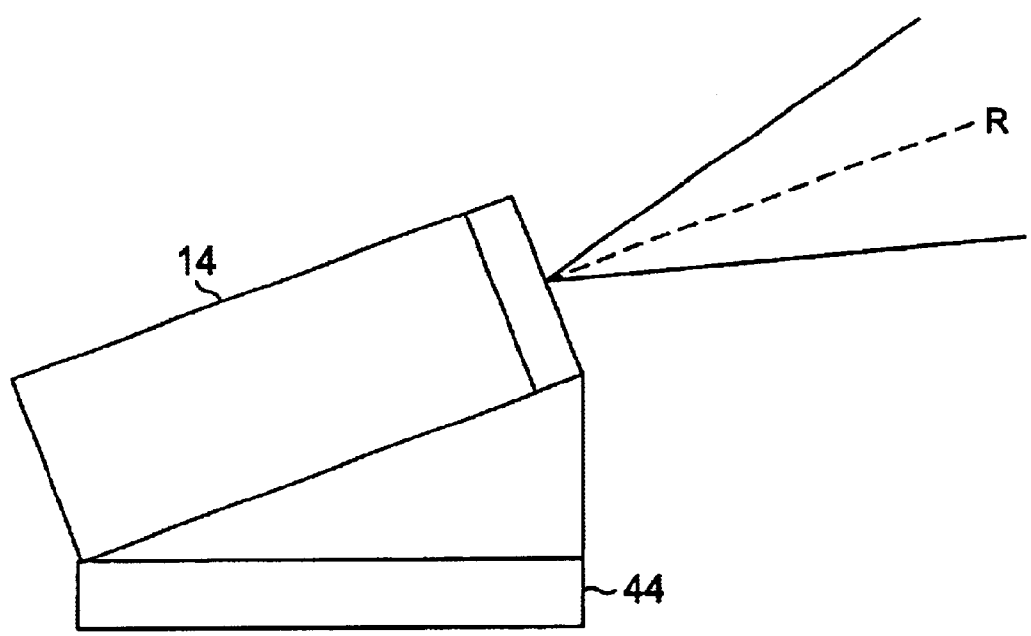
FIG. 8 is a side view of the source positioned on a wedge to rotate the direction of an emitted radiation beam upward.

The vertically diverging beam 43 may be defined by one or more collimators 62, as is known in the art. The collimator 62 may be integrated with the source 14. The vertical height of the vertically diverging beam at the face 20a of the cargo conveyance 20 may be slightly greater than the height of the conveyance. Since the source 14 is close to the ground, in order to irradiate an entire vertical slice of the cargo conveyance 20, the collimator 62 may be an asymmetrical collimator. The arc $\alpha$ of the radiation beam B may be about 90 degrees, for example. It may extend from about −20 degrees to about +70 degrees, for example with respect to a vertical line V. The extent of the arc $\alpha$ and its orientation in a particular application depends on the distance between the source 14 and the detector 18, the height of the cargo conveyance 20 and the position of the cargo conveyance 20 in the gap. Alternatively, the direction of the central ray R of the source 12 may be rotated upward, as shown in the schematic representation of FIG. 8. The central ray may be rotated by placing a wedge 64 between the source 14 and the carriage 44, for example. At least part of the vehicle 22, including at least part of the wheels 22a, may be scanned as well, by suitably setting the dimensions of the components of the system 10 and the distance between the first and second vehicles 12, 16.

The radiation source 14 may be a source of X-ray radiation, such as Bremsstrahlung radiation, for example. The source 14 may emit radiation having an appropriate energy for the configuration of the system 10, the width "W" of the cargo conveyance 20 (see FIG. 9) and the contents of the cargo conveyance, which would be apparent to one of ordinary skill in the art. To examine a cargo conveyance 20 having a width W greater than about 5 feet (about 1.5 meters) by a radiation scanning system 10 in accordance with the embodiment of FIG. 1, it would generally be desirable for the X-ray source 14 to generate a radiation beam B having a nominal energy greater than about 1 MV to penetrate through the entire width W of the conveyance, as is known in the art. If the contents of the conveyance 20 is not very dense, a lower energy may be used. Higher energies may be used, as well. The source 14 may also emit radiation at multiple energies.

The X-ray source 14 may be a linear accelerator, such as a Linatron® Linear Accelerator ("Linatron®"), available from Varian Medical Systems, Inc., Palo Alto, Calif. ("Varian") for example, that emits radiation at one or more nominal energies. A Linatron® M9, with ultra-low leakage, which is capable of emitting radiation at nominal energies of 6 MeV and 9 MeV, may be used, for example. A linear accelerator emitting radiation at other energies, such as 3.5 MeV and 6 MeV, or 5 MeV and 10 MeV, for example, may also be used. Other types of X-ray sources may also be used, such as electrostatic accelerators, microtrons and betatrons, for example. X-ray tubes may also be used, particularly for cargo conveyances and other objects having a width W less than about 5 feet (1.5 meters). Another possible radiation source is a radioactive isotope, such as cobalt 60. Alternatively, neutrons or gamma rays may be used to scan the cargo conveyance 20. Neutron and gamma ray radiation sources are known in the art, as well.

The detector 18 may be a detector array. To detect a fan beam of radiation, the detector array 18 may be a one dimensional detector array comprising one or more modules of detector elements, as is known in the art. Each one dimensional detector module may comprise a single row of a plurality of detector elements. Shielding may be provided in the back of the module and/or behind the detector array 18, as is known in the art. Preferably, the detector 18 and associated shielding extends beyond the profile of the radiation beam, so that additional shielding is not necessary. Additional shielding may be provided if desired, however.

The detector or detector array 18 may extend vertically when deployed and have a height "Hv", as in FIG. 7, for example. The detector or detector array 18 may also have a horizontal section 18a perpendicular to vertical section 18b, to extend over the cargo conveyance 20 when deployed, as shown in phantom in FIG. 7. The vertical height of the detector 18 could then be less than Hv. The horizontal section 18a may be connected to the vertical section 18b by a pivot 18c, for example, enabling the horizontal section to be folded against the vertical section, when not deployed.

The detector elements may comprise a radiation sensitive detector, such as a scintillator, and a photosensitive detector, such as a phototube or photodiode, as is known in the art. A high density scintillator, such as a cadmium tungstate scintillator, may be used. The scintillator may have a density of 8 grams per cubic cm, for example. 2,000 detector elements with a pitch of 2 mm may be provided in a linear array with a linear array of photodiodes, for example. The vertical height Hv of the detector 18 would then be 4,000 mm. Appropriate cadmium tungstate scintillators are available from Saint Gobain Crystals, Solon, Ohio, U.S.A. and Spectra-Physics Hilger Crystals, Kent, U.K. for example. Detector modules having detection efficiencies of from about 10% to about 80% are preferably used, depending on the radiation spectrum of the radiation beam. If a cone beam of radiation is used, the detector array 18 may comprise one or more rows of two dimensional detector modules. A two dimensional detectors module may comprise a plurality of rows and columns of detector elements.

Returning to FIG. 1, supporting components for the source 14 may also be mounted on the first vehicle 12. For example, if the source 14 is a linear accelerator, a generator 64 to provide power to the source 14, an RF tub 65 containing a microwave generation system for the accelerator, a temperature control unit ("TCU") 66 to stabilize the temperature of the linear accelerator, and a modulator 68 to modulate the pulses driving the linear accelerator, may be mounted on the first vehicle 12. Storage 70 may also be mounted on the first vehicle 12, to contain accessories used with the system 10, such as high voltage cables, quick connect cables, water cooling hoses, spare parts and tools, for example. The generator 64 may be a 55 KVA generator, for example. The RF tub 65 may be mounted on the source 14. Supporting components for the detector 18, such as a generator 72 and signal processing system 74, may be mounted on the second vehicle 16. The generator 72 may be a 25 KVA generator, for example.

The detector array 18 is electrically coupled to the signal processing system 74, which may include a processor, such as a computer, and analog-to-digital conversion circuitry (not shown). In one example, the signal processing system 74 reconstructs the data output by the detector array 18 into images that may be displayed on a monitor 76. The monitor 76 may be provided in a space 78 behind a driver's seat in one of the vehicles 12, 16, shown in phantom in FIG. 1. If the monitor 76 is provided in one of the truck portions 24, 26, it is generally more practical to provide the monitor 76 in the same vehicle that supports the detector (the second vehicle 16). The space 78 behind the seat may have a height of about 82 inches (about 2.08 meters) and a width of about 70 inches (about 1.78 meters), for example, which is more than enough to accommodate the monitor 76 and an operator. The forward truck position 26 may be suitably shielded to protect the operator, as is known in the art.

The monitor 76 may also be located in a separate facility, such as a motor home or an office container. The separate facility may be at the inspection site or at a remote location. An office container could be carried on one of the first and second vehicles 12, 16 prior to deployment. The office container could be removed from the vehicle at the inspection site, by a crane, for example. The remote location may be at a central office, for example. The display may be coupled to the image processing circuit by wires or a radio frequency transmit/receive system, for example.

A control system 79 comprising one or more program logic controllers in one or more computers may be coupled to the monitor 76, to the motors causing movement of the source 14 and the detector 18, to the signal processing system 74 and to other system components, via wires or a wireless connection, to control their operation. The control system 79 may be in the same location as the monitor 76, as shown in FIG. 1, or in another location. Other control configurations may be used, as well.

The signal processing system 74 preferably enables real-time viewing of an image of the contents of the cargo conveyance 20, as it is being acquired. It also preferably enables an operator to pan (move a cursor to particular region of the image), zoom in on selected regions of the image, conduct edge enhancement, reverse video (reverse state of dark and light regions), select pseudo coloring of the image based image densities, select contrast enhancement, and mark and annotate regions of interest. Two display monitors are preferably provided for side-by-side comparison of the same image under different test and display conditions. For example, each monitor may display an image derived from data acquired at different energies. Data acquired at different energies may be merged for display on one monitor, as well. The image processor may be a PC based Pentium(R) 4 image processor, for example, with line scanning inspection software, as is known in the art. In this example, the signal processing system provides processed data to the control system 79, which may further process the data for display on the monitor 76.

Other system components may include a management database, disk storage (preferably for over 1,000 full scan images), a color laser printer and a document scanner. Preferably, the system has Internet access to send images to other locations for analysis. More preferably, the Internet access is wireless Internet access.

The detector array 18 may comprise detector elements or sensors to detect nuclear materials instead of or in addition to the detector elements for imaging the contents of the cargo conveyance 20, described above. Detectors or sensors that detect radiation emitted by nuclear material, are described in "Portable System from Berkeley Nucleonics Detects 'Dirty Bombs'," Berkeley Nucleonics, Jun. 12, 2002, available on Yahoo! Finance, for example. Portal Monitors for the detection of radioactive and special nuclear material, such as those available from Polimaster Ltd, Minsk, Belarus, may also be adapted for use with the system of the present invention.

Figure 9:
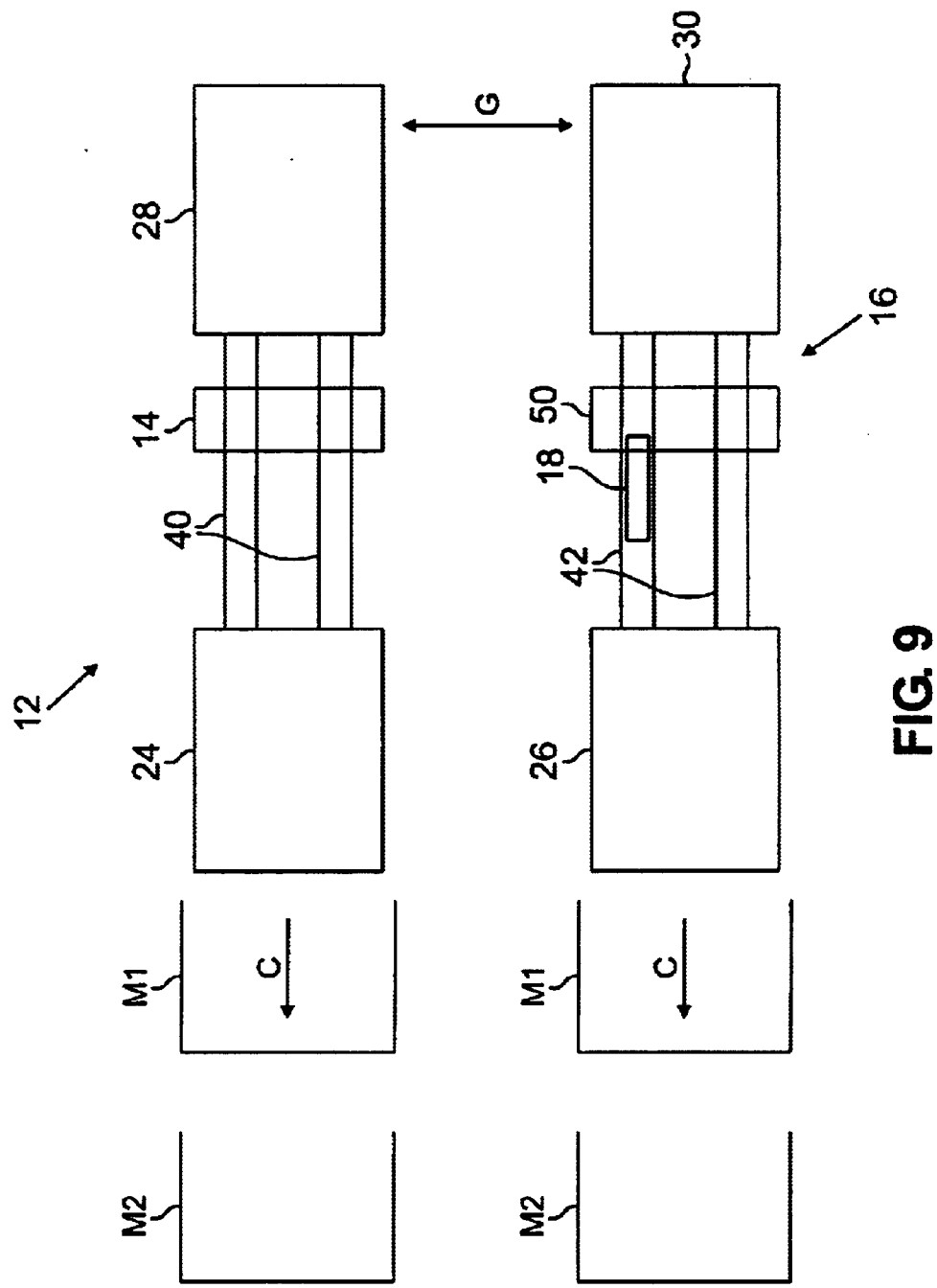
FIGS. 9–12 are top, schematic views of a radiation scanning system in accordance with an embodiment of the invention, during various steps in a method of inspecting an object such as a cargo conveyance, in accordance with an embodiment of the invention.

To use the system 10, an appropriate site is first identified. The site needs to be generally flat. The vehicles 12, 16 are then driven to the inspection site. The inspection site may be at or near a border crossing, a site of an emergency, a roadblock, along an approach to a bridge, at a seaport or anywhere else inspection of objects such as cargo conveyances is needed. At the site, the first and second vehicles 12, 16 drive in the direction of arrow C and park parallel to each other, as shown in FIG. 1 and FIG. 9, which is a top schematic view of the first and second vehicles. Markings M1 may be provided along the ground to indicate where the vehicles 12, 16 should stop. The front ends of the vehicles 12, 16 are preferably aligned within 3 inches (76.2 mm) of each other. The system 10 may compensate for small deviations in the terrain of the inspection site and misalignment of the first and second vehicles 12, 16, by auto leveling of the system and/or by appropriate processing of acquired data. As mentioned above, the first and second vehicles 12, 16 may be separated by a gap G of about 30 feet (about 9.14 meters), for example. The alignment of the two vehicles 12, 16 may be checked by a laser system, for example, as is known in the art.

Figure 10:
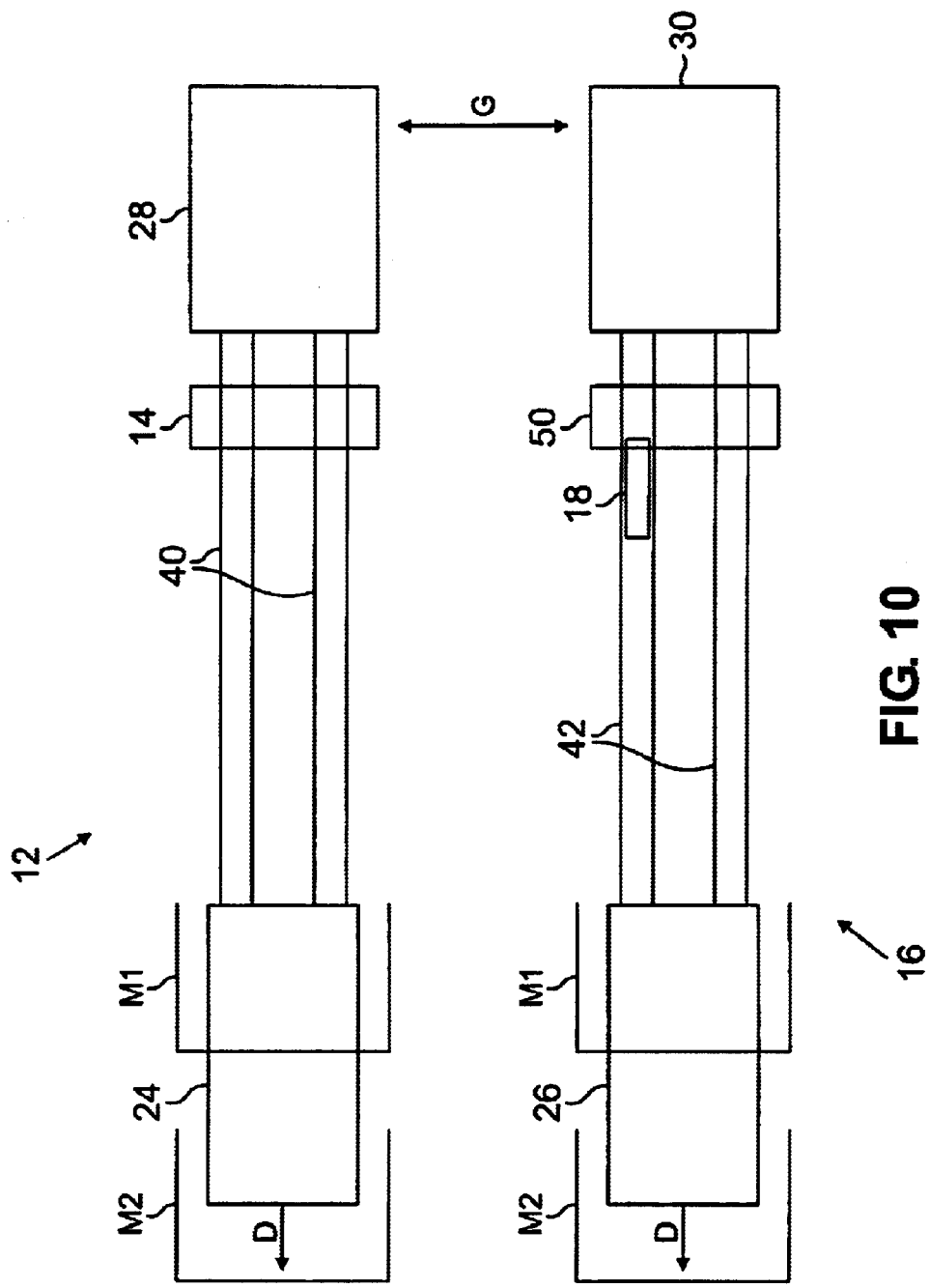

After parking in a proper location, the rails 40, 42 are unlocked and the forward truck portions 24, 26 of the first and second vehicles 16, 18 are driven forward along arrow D to extend the rails 40, 42 a desired distance, as shown in FIG. 10. Markings M2 may be provided along the ground to indicate how far the truck portions 24, 26 should be driven. The alignment of the first and second vehicles 12, 16 may be verified by laser again.

Figure 11:
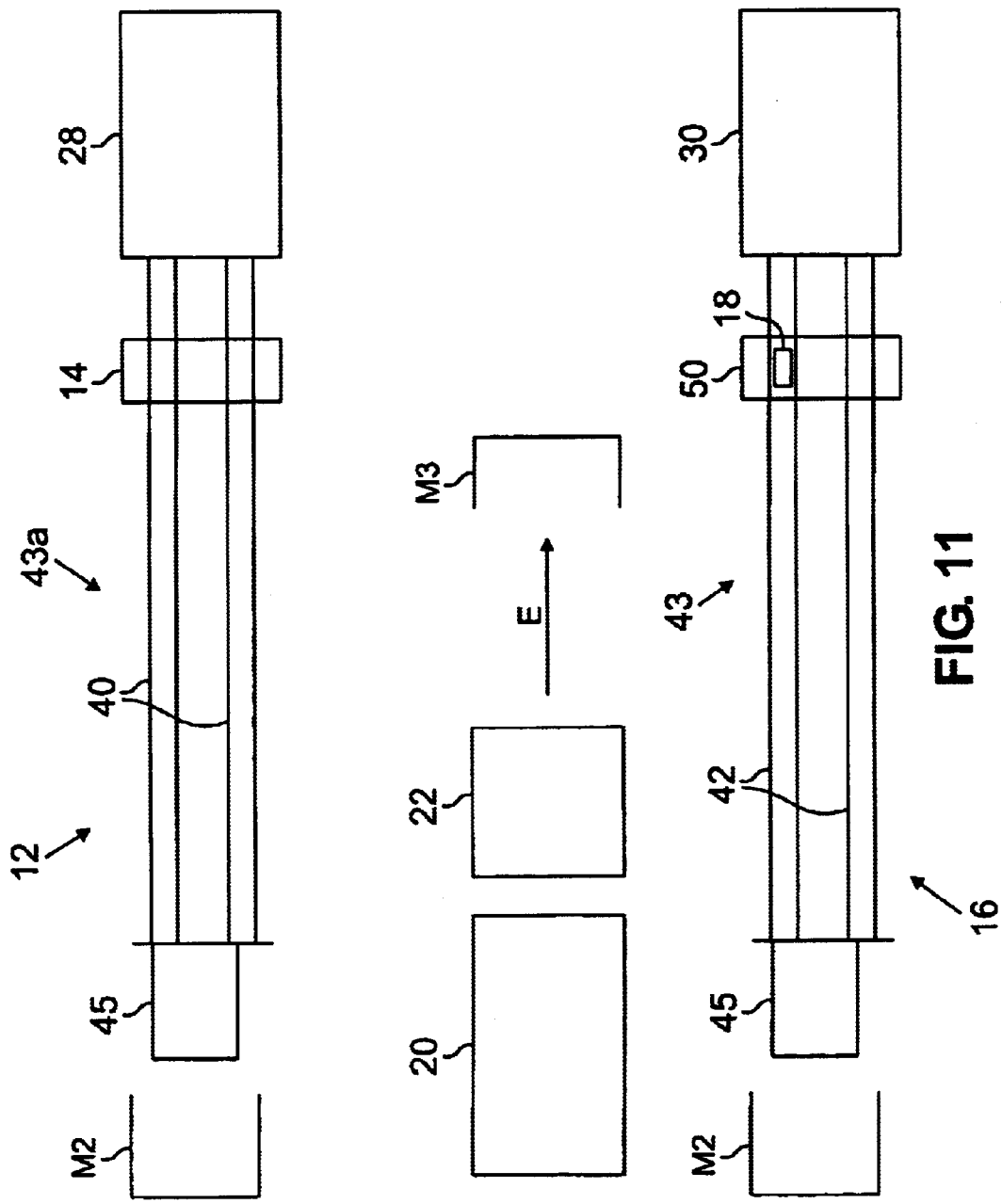

The forward, truck portions 24, 26 of the first and second vehicles 12, 16 are then preferably separated from the vehicles. First, the supporting legs 45b of the trailers 43a, 43b are preferably extended to support the trailers 43a, 43b on the ground. (See FIGS. 2b and 5). The forward truck portions 24, 26 of the first and second vehicles 12, 16 may then be disconnected from the trailers 43a, 43b, respectively, and driven away. The supporting legs 45b and the wheels 32, 34 may now be retracted, to lower the rails 40, 42 to the ground, as shown in FIG. 6. The detector 18 may be rotated into the vertical position before the rails 42 are being extended, as they are being extended or afterwards. FIG. 11 shows the trailers 43a, 43b after the forward truck portions 24, 26 are driven away. FIG. 11 also shows the detector 18 in its deployed, vertical position, as in FIGS. 1 and 7.

The cargo conveyance 20 to be inspected may then be driven between the trailers 43a, 43b by the truck 22 along arrow E, as is also shown in FIG. 11. A marking M3 may be provided on the ground to indicate where the truck 22 should be positioned. Preferably, the cargo conveyance 20 is closer to the second vehicle than to the first vehicle, decreasing the size of the arc of the fan beam required to encompass the full height of the cargo conveyance 20, and decreasing the required height of the detector 18. The truck 22 may be driven into position from either direction. The driver of the truck 22 would typically then leave the truck 22, after which time inspection may commence.

Figure 12:
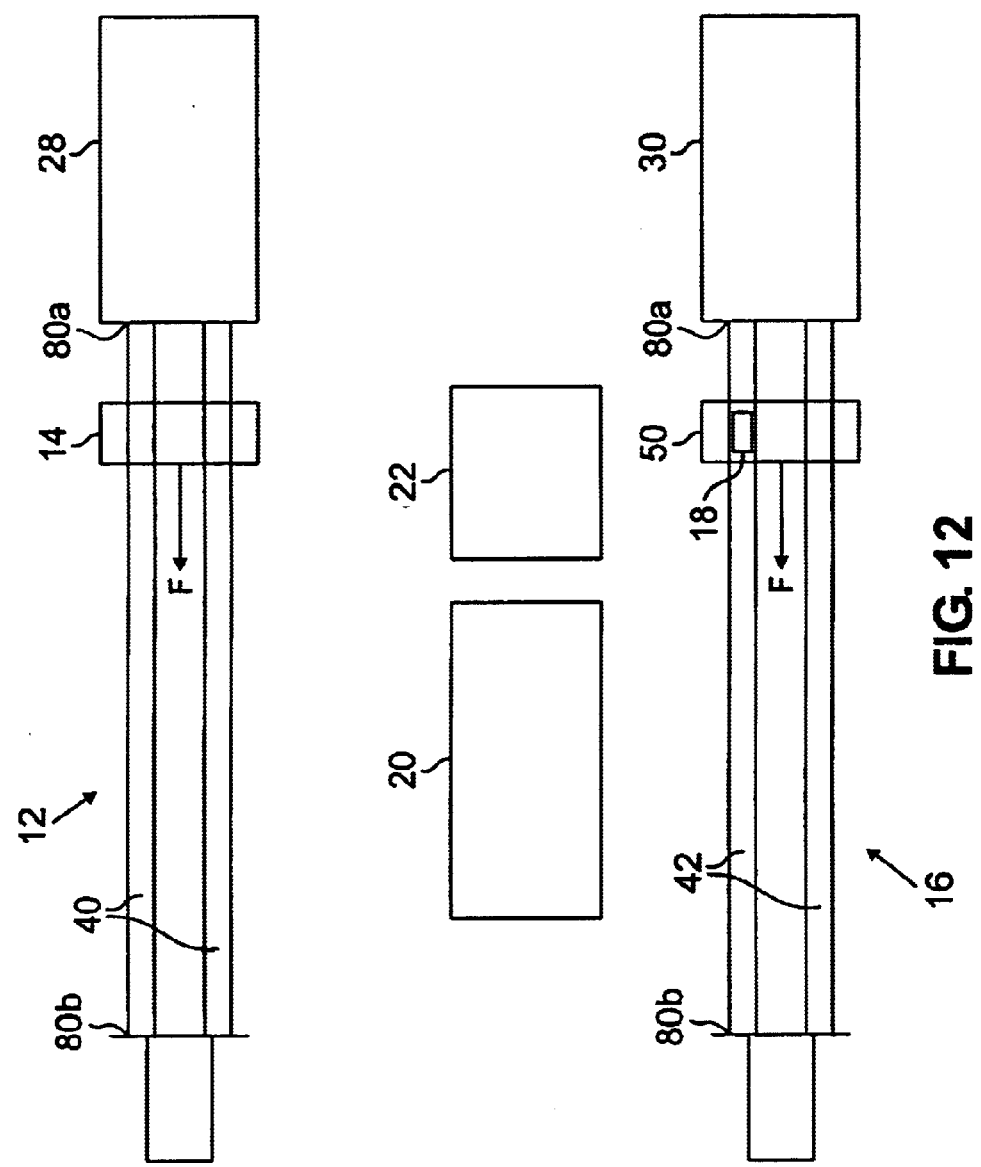

In accordance with this embodiment, the radiation source 14 and the detector 18 are synchronously moved along the rails 40, 42, respectively, from a first end 80a to a second end 80b of the rails, along arrows F, to conduct a line scan of the cargo conveyance 20 along its entire length, as shown in FIG. 12. The cargo conveyance 20 may be scanned at two different energy levels, such as 6 MeV and 9 MeV, for example. The source 14 may be rapidly switched between the two energy levels during scanning. Alternatively, the source 14 may emit radiation at one energy level when the source 14 and the detector 18 are moved from the first end 80a to the second end 80b and at the second energy level when the source and the detector 18 are moved from the second end 80b to the first end 80a of the rails 40, 42. The truck 20 may be scanned, as well, including at least part of the wheels 22a (See FIG. 7).

After scanning, the driver may return to the truck 22 and drive away. A second truck 22a and cargo conveyance 20a may then be driven between the two trailers 12, 16 to be scanned. Both the source 14 and the detector 18 will be at the second end 80b of the rails 40, 42 after scanning the first cargo conveyance 20. When scanning the second cargo conveyance 20a, the source 14 and the detector 18 may be moved back to the first end 80a. Alternatively, the source 14 and the detector 18 may be returned to the first end 80a after scanning the first cargo conveyance 20, and prior to scanning the second conveyance.

Figure 13:
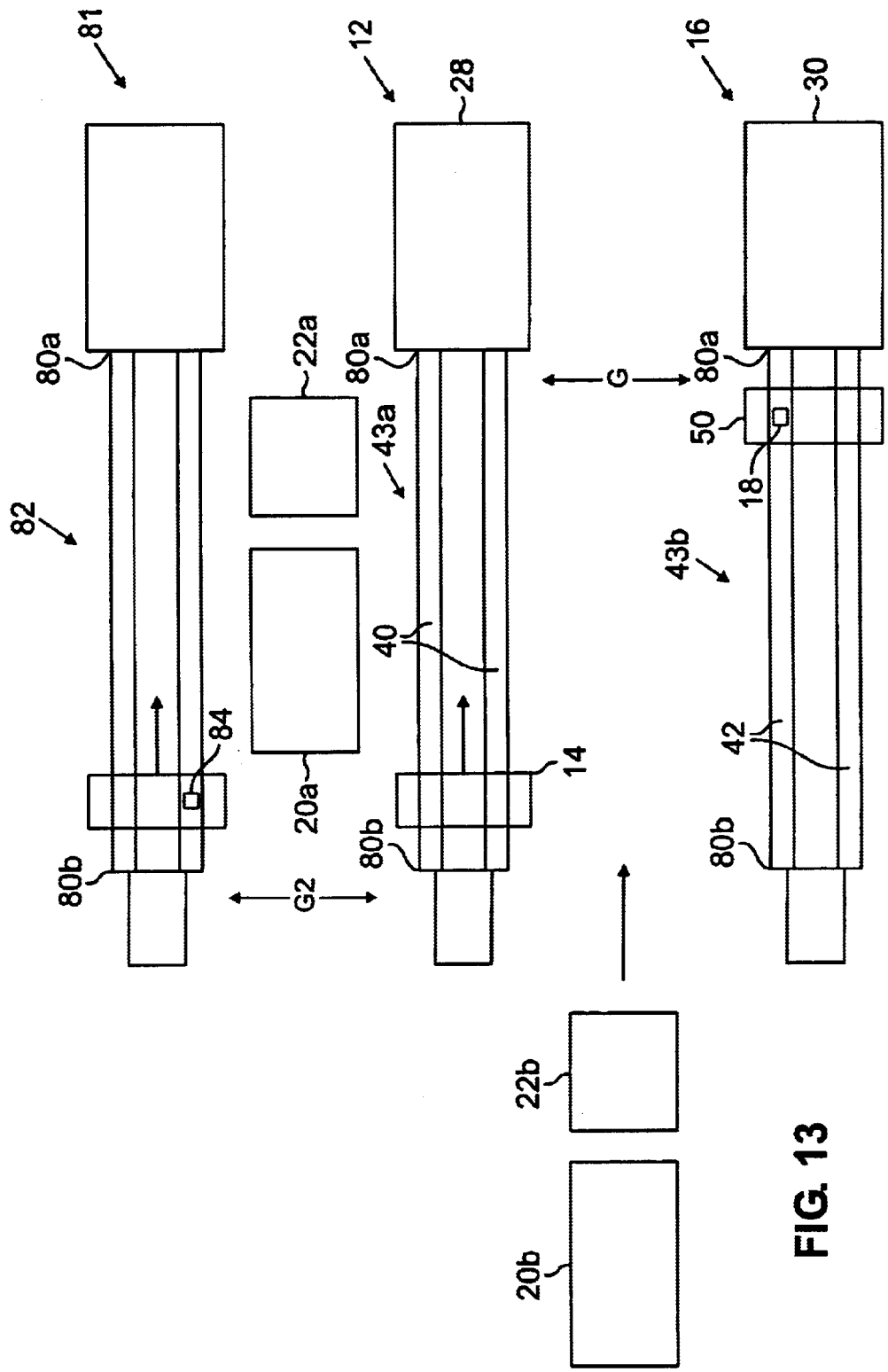
FIG. 13 is a top, schematic view of the system of FIG. 1, including a trailer portion of an additional vehicle supporting an additional detector for increased throughput, during use in inspecting another object.
Figure 14:
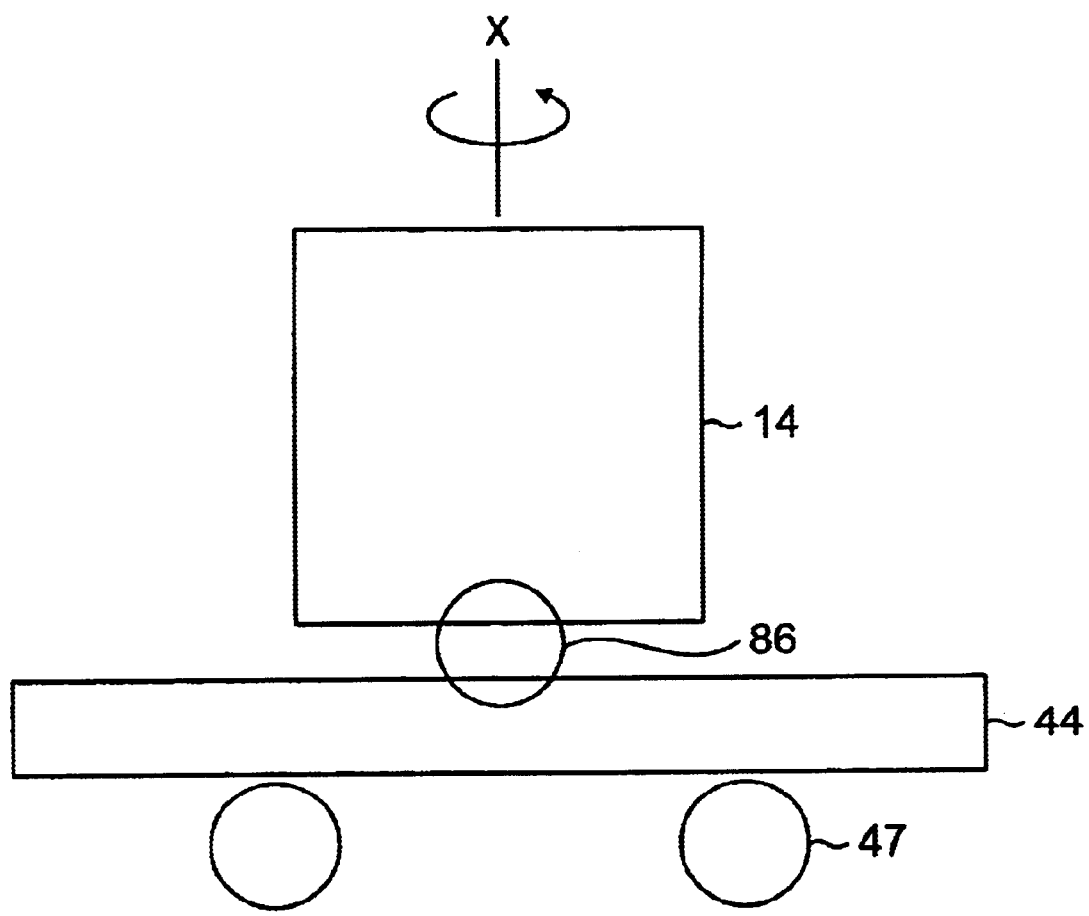
FIG. 14 is a side view of a source pivotally connected to a base for use with the system of FIG. 13.

To increase throughput of the scanning system 10, the system 10 may comprise an additional vehicle similar to the second vehicle 16, supporting a second detector 84. FIG. 13 shows a trailer 82 of the additional vehicle, parallel to the first trailer 43a of the first vehicle 12. A gap G2 is indicated between the trailer 82 and the trailer 43a. The second cargo conveyance 20a may be driven into the gap G2 for inspection, by a second truck 22a. The radiation source 14 on the first vehicle 12 may be pivotally supported on the carriage 44 by a pivot 86, as shown in FIG. 14. After inspection of the first cargo conveyance 20, the source 14 may be rotated about an axis X to face the second cargo conveyance 86. The second cargo conveyance 20a may then be inspected, preferably by moving the source 14 and the detector 18 from the second end 80b to the first end 80a of the rails. While the second cargo conveyance 20a is being inspected, a third cargo conveyance 20b may be driven into the gap G between the first and second vehicles by a third truck 20b. When inspection of the second cargo conveyance 20a is completed, the source 14 may be rotated to face the third cargo conveyance 20c. The third cargo conveyance 20c may then be inspected, preferably by moving the source 14 and the detector 18 from the first end 80a to the second end 80b of the rails 40, 42. This process may be repeated with subsequent cargo conveyances, nearly doubling the throughput of the system 10.

Figure 15:
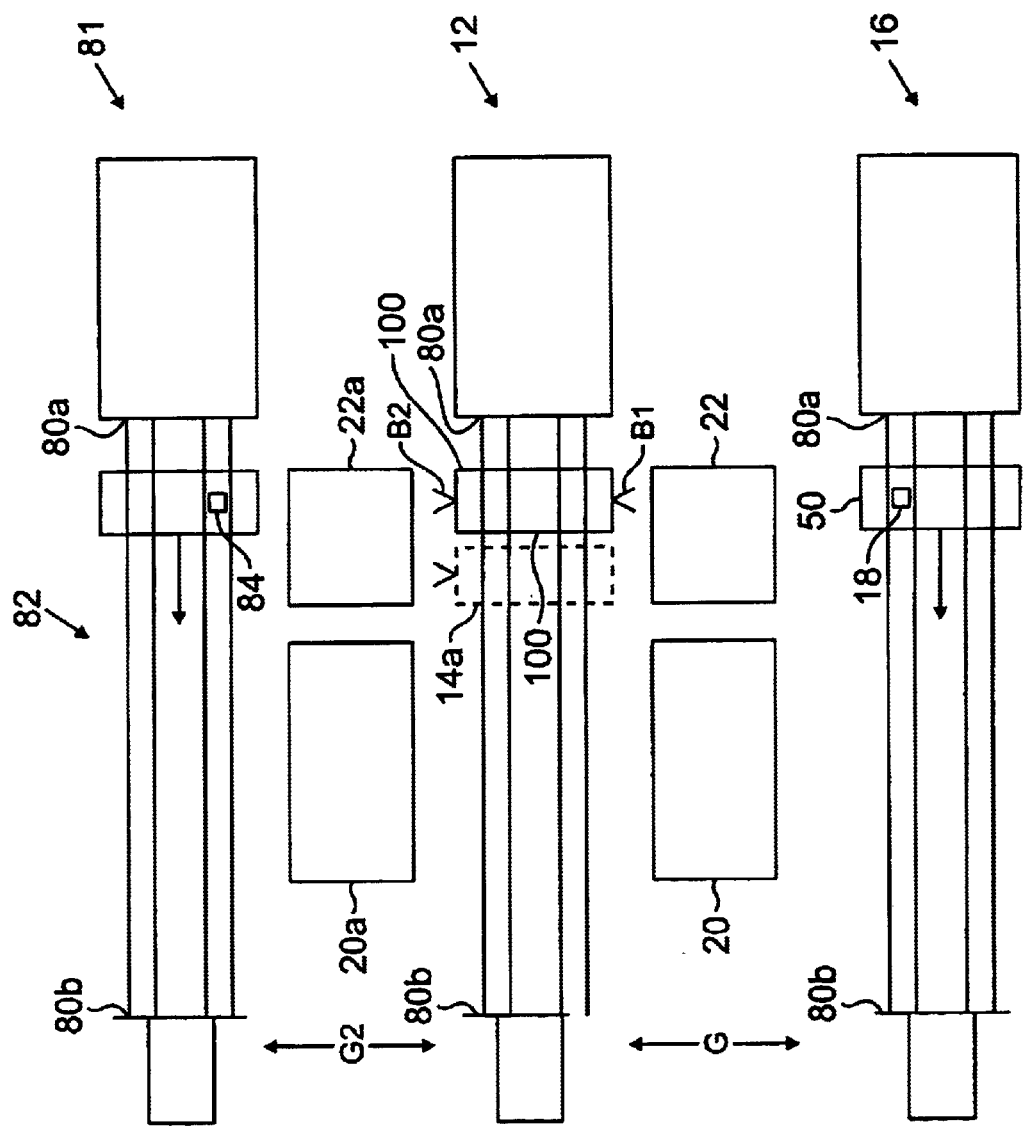
FIG. 15 is a top schematic view of another high throughput system.

Two cargo conveyances, 20, 20a, one in each gap G, G2, may be inspected simultaneously by two sources 100 mounted on the same carriage 44, facing opposite directions, as shown in FIG. 15. First and second beams B1, B2 are shown emitted in opposite directions. Alternatively, a second source 14a, shown in phantom, may be mounted on a separate carriage, facing an opposite direction as the first source 14 of FIG. 12, for example. If two sources 100 are used, operation of each source is preferably controlled separately.

Figure 16:
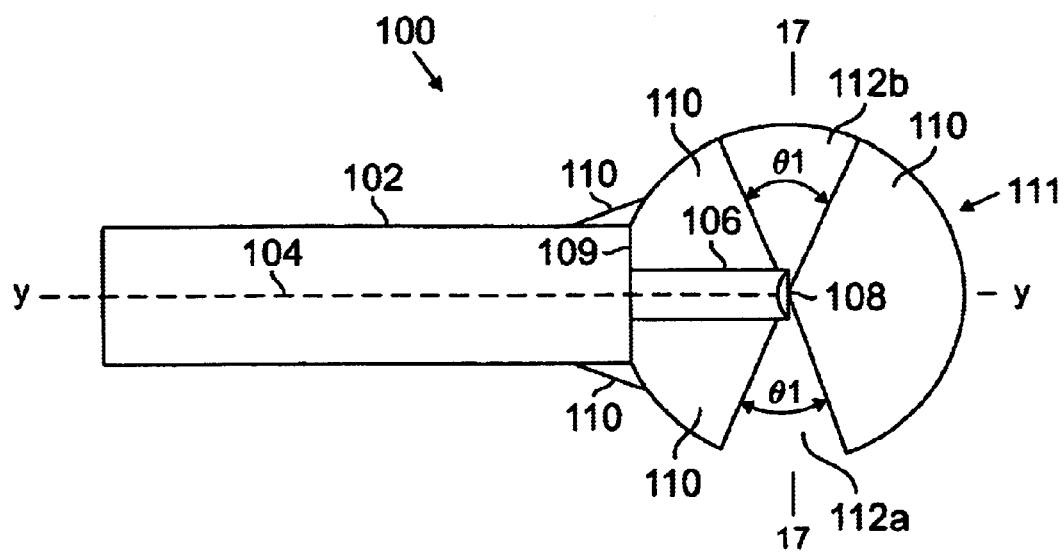
FIGS. 16 and 17 are side and front views, respectively, of an alternative source for use in the system of FIG. 15, that emits two radiation beams simultaneously in opposite directions.

Alternatively, beams B1 and B2 may be emitted by a "panoramic" source 100, adapted to emit radiation beams in opposite directions. A "panoramic" source is described in application Ser. No. 10/199,781, which was filed on Jul. 19, 2002, is assigned to the assignee of the present invention and is incorporated by reference, herein. FIG. 16 is a top, partial cross-sectional view of the panoramic source 100. The panoramic source 100 comprises a linear accelerator body 102, which may be a Varian Linatron®, as described above, or may have other configurations known in the art. The linear accelerator body 102 has an open output end 103. An electron beam 104, shown in phantom, is accelerated as it follows a path through the linear accelerator body 102 along a longitudinal axis Y of the body. The electron beam 104 exits the accelerator body from the output end 103. A proximal end of a tube 106, referred to as a drift tube, is connected to the output end 103 of the linear accelerator body 102, in communication with and extending from the open output end. The drift tube 106 may have a diameter of from about 6 to about 10 mm, for example. The drift tube 106 may be the same material as the linear accelerator 102, to facilitate the connection of the drift tube to the linear accelerator body. The drift tube 106 and linear accelerator body 102 may be metal for example. The drift tube and linear accelerator body may be other materials, as well.

A target material 108 of a metal with a high atomic number and a high melting point, such as tungsten or another refractory metal, is provided at the distal end of the drift tube 106. Shielding material 110, such as tungsten, steel or lead, is provided around the drift tube 106, and the target material 108 and may extend over a distal portion of the linear accelerator body 102, as well. The shielding material 110 may be in the shape of a sphere, for example, and the target material 108 may be at the center of sphere, within the drift tube 106. The shielding material 110 may also have other shapes. The drift tube 106, the target material 108 and the shielding material are referred to as a "shielded target 111".

Figure 17:
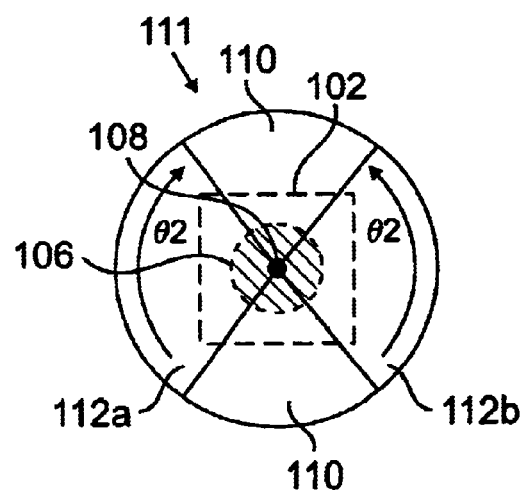

First and second collimating slots 112a, 112b extend from the end of the drift tube 106, through the shielding material 110, transverse to the longitudinal axis L1 of the linear accelerator body 102. The slots 112a, 112b are shaped to collimate the X-ray beam emitted by the target material into a vertically diverging beam, such as a fan beam or a cone beam, which are emitted from the shielded target in opposite directions, perpendicular to the axis Y of the accelerator body 102. The slots 112a, 112b have first angular dimensions θ1, that define the horizontal width of the vertically diverging beam. The slots 112a and 112b will typically have the same angular dimension θ1, but that is not required. θ1, which is shown exaggerated in this view, will typically be small to define a small horizontal dimension of a vertically diverging fan beam. FIG. 17 is a cross-sectional view of the shielded target 111 along axis 17 in FIG. 16, showing second angular dimensions θ2 of the slots 112a, 112b. The second angular dimension θ2 defines the angle of the fan beam, which may be about 90 degrees, for example.

The electron beam 104 emitted by the linear accelerator body 102 along the longitudinal axis L1 passes through the drift tube 106 and impacts the material 108. Bremsstrahlung X-ray radiation is emitted from the target material 108 in all directions. The radiation emitted in the direction of the collimating slots 112a, 112b is collimated into the desired shape and emitted from the device 100. The shielding material 110 absorbs radiation emitted in other directions.

Figure 18:
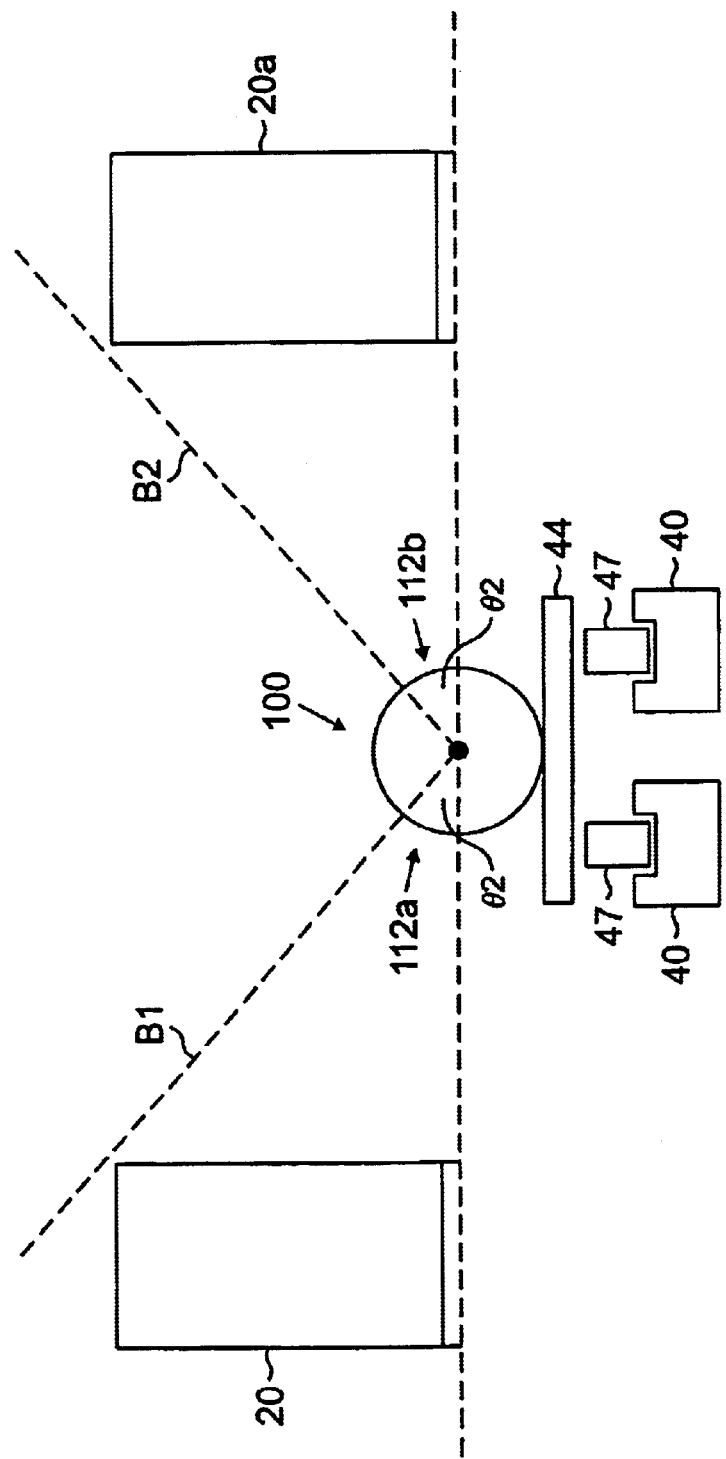
FIG. 18 is a front view of the system of FIG. 15 and the source of FIGS. 16 and 17, in use inspecting two objects.

FIG. 18 shows the radiation source 100 with a shielded target 111 supported by the carriage 44. The wheels 47 of the carriage 44 and the rails 40 of the first vehicle 12 are also shown, as are the cargo conveyance 20 and the cargo conveyance 20*a*. Additional components of the system, such as the detectors 18, 84 and the trailers 43*a*, 82, are not shown to ease illustration. The source 100 is shown emitting two vertical fan beams B1, B2 simultaneously towards the cargo conveyance 20 and the cargo conveyance 20*a*, respectively.

The radiation scanning system 10 in accordance with embodiments of the present invention is mobile, may be easily transportable is inexpensive and may be simply and rapidly, deployed. The vehicles 12, 16 of the system 10 may be driven without permits. The system may be operated by only two people.

While in the preferred embodiments described above, one or more cargo conveyances supported by trucks are inspected, the system of the present invention may be used to inspect cargo conveyances supported by other types of vehicles or in other ways. Other types of objects can also be inspected. For example, motor vehicles, such as trucks and buses, could be inspected. While the trailers 43*a*, 43*b* described above are telescoping, it is noted that telescoping is not required, particularly when inspecting shorter objects.

In addition, while the source 14 and the detector 18 are movable across the lengths of the telescoping portions of the vehicles 12, 16 in the embodiments above, the source 14 and/or the detector 18 may be moved by a telescoping portion of a respective vehicle.

One of ordinary skill in the art will recognize that changes may be made to the preferred embodiments described above without departing from the spirit and scope of the invention, which is defined by the claims, below.

What is claimed is:

1. A radiation scanning system to inspect objects, the system comprising:
   a first vehicle having an expandable length;
   a radiation source to illuminate an object to be inspected, the source being movably supported by the first vehicle;
   a second vehicle having an expandable length; and
   a detector to detect radiation interacting with the object, the detector being movably supported by the second vehicle.

2. The system of claim 1, wherein:
   the first vehicle comprises a first expandable portion;
   the source is movable across the expandable portion;
   the second vehicle comprises a second expandable portion; and
   the detector is movable across the second expandable portion.

3. The system of claim 2, wherein:
   the first and second expandable portions have a first position supported above ground and a second, lowered position, on the ground.

4. The system of claim 2, wherein the first and second expandable portions each comprise telescoping sections.

5. The system of claim 3, wherein:
   the first expandable portion comprises a first supporting surface to movably support the source; and
   the second expandable portion comprises a second supporting surface to movably support the detector.

6. The system of claim 5, wherein:
   the first supporting surface comprises a first pair of rails; and
   the second supporting surface comprises a second pair of rails.

7. The system of claim 5, wherein:
   the source is movable across the first supporting surface by a first motor; and
   the detector is movable across the second supporting surface by a second motor.

8. The system of claim 7, wherein operation of the first and second motors are synchronized.

9. The system of claim 1, wherein:
   the radiation source is adapted to emit a vertically diverging beam of radiation; and
   the detector is adapted to detect the vertically diverging beam interacting with the object.

10. The system of claim 9, wherein:
    the detector has a deployed position to detect radiation; and
    the detector has a non-deployed, horizontal position.

11. The system of claim 1, wherein:
    the radiation source is a source of X-ray radiation.

12. The system of claim 1, wherein:
    the first vehicle comprises:
       a first trailer with an expandable length; and
       a first truck releasably coupled to the first trailer portion; and
    the second vehicle comprises:
       a second trailer with an expandable length; and
       a second truck releasably coupled to the second trailer portion.

13. The system of claim 1, further comprising:
    a third vehicle having an expandable length; and
    a second detector movably supported by the third vehicle, to detect radiation interacting with a second object.

14. The system of claim 13, further comprising:
    a second source supported by the first vehicle, to illuminate the second object.

15. The system of claim 13, further comprising:
    a base to support the source;
    wherein the source is pivotally connected to the base and the source is selectively rotatable about the pivot, to selectively illuminate the first and second objects.

16. The system of claim 13, wherein:
    the source is adapted to illuminate the first and second objects, simultaneously.

17. The system of claim 1, wherein:
    the detector is movably supported by the vehicle to detect radiation transmitted through the object, during operation.

18. A radiation scanning system to inspect objects, the system comprising:
    a first vehicle;
    a radiation source to illuminate an object to be inspected, the source being movable on the first vehicle;
    a second vehicle; and
    a detector to detect radiation interacting with the object, the detector being movable on the second vehicle.

19. The system of claim 18, wherein the source and the detector are movable across a length of the first and second vehicles, respectively.

20. The system of claim 18, wherein:
    the detector is movable on the second vehicle to detect radiation transmitted through the object, during operation.

21. A radiation scanning system to inspect objects, the system comprising:

a first vehicle comprising:
  a first drive portion;
  a first telescoping portion; and
  a radiation source movably supported by the first telescoping portion to illuminate an object to be inspected; and
a second vehicle comprising:
  a second drive portion;
  a second telescoping portion; and
  a detector movably supported by the second telescoping portion, to detect radiation interacting with the object.

22. The system of claim 21, wherein the first and second telescoping portions each comprise:
  at least one first rail; and
  at least one second rail received within a respective first rail.

23. The system of claim 22, wherein the first and second telescoping portions each comprise:
  at least one third rail received within the at least one second rail.

24. The system of claim 21, wherein:
  the detector is movably supported by the second telescoping portion to detect radiation transmitted through the object, during operation.

25. A radiation scanning system to inspect objects, the system comprising:
  a first vehicle comprising:
    a first truck;
    a first telescoping trailer releasably coupled to the first truck; and
    a radiation source movable across at least a portion of the first telescoping trailer to illuminate an object to be inspected; and
  a second vehicle comprising:
    a second truck;
    a second telescoping trailer releasably coupled to the second truck; and
    a detector movable across at least a portion of the second telescoping trailer, to detect radiation interacting with the object.

26. The system of claim 25, wherein:
  the detector is movable across at least a portion of the second telescoping portion to detect radiation transmitted through the object, during operation.

27. A method of inspecting an object, comprising:
  positioning an object to be inspected between stationary first and second vehicles, wherein the first vehicle movably supports a radiation source and the second vehicle movably supports a detector;
  moving the radiation source across a length of the first vehicle;
  illuminating the object with radiation by the moving source;
  moving a detector supported by the second stationary vehicle across a length of the second vehicle; and
  detecting radiation interacting with the object by the moving detector.

28. The method of claim 27, further comprising:
  driving the first vehicle to an inspection site;
  driving the second vehicle to the inspection site; and
  aligning the first and second vehicles.

29. The method of claim 27, further comprising:
  expanding the length of the first vehicle;
  moving the source along the expanded length of the first vehicle; and
  expanding the length of the second vehicle; and
  moving the detector along the expanded length of the second vehicle.

30. The method of claim 27, where the source and the detector are moved in a first direction, the method further comprising:
  moving the object from between the first and second vehicles after inspection;
  positioning a second object to be inspected between the first and second vehicles; and
  moving the source and the detector in a second direction opposite the first direction to inspect the second object.

31. The method of claim 27, wherein the detector has a first, vertical position and a second, horizontal position, the method further comprising:
  moving the detector from the second position to the first position prior to moving the detector across the second vehicle.

32. The method of claim 27, further comprising:
  emitting a vertically diverging beam of radiation from the source onto the object.

33. The method of claim 32, comprising:
  emitting a vertical fan beam of radiation from the source onto the object.

34. The method of claim 32, further comprising:
  emitting X-ray radiation from the source onto the object.

35. The method of claim 33, further comprising:
  emitting radiation of multiple peak energies from the source onto the object.

36. The method of claim 27, wherein the object is conveyed by a third vehicle, the method comprising:
  positioning the object by driving the third vehicle to a position between the first and second vehicles.

37. The method of claim 27, further comprising:
  moving a second object to be inspected between the first vehicle and a third stationary vehicle aligned with the first vehicle;
  illuminating the second object with radiation by the moving source;
  moving a second detector supported by the third vehicle across a portion of the third vehicle; and
  detecting radiation interacting with the object by a second detector.

38. The method of claim 37, comprising:
  illuminating the second object after illumination of the first object.

39. The method of claim 37, comprising:
  illuminating the second object while illuminating the first object.

40. The method of claim 29, wherein the expanded length of the first and second vehicles spans respective portions of the first and second vehicles, the method further comprising:
  lowering the respective portions to the ground.

41. The system of claim 27, comprising:
  detecting radiation transmitted through the object by the moving detector.

* * * * *